United States Patent
Jones et al.

(10) Patent No.: US 7,197,173 B2
(45) Date of Patent: Mar. 27, 2007

(54) AUTOMATED CHECK PROCESSING SYSTEM WITH CHECK IMAGING AND ACCOUNTING

(75) Inventors: John E. Jones, Winnetka, IL (US); Paul A. Jones, Glenview, IL (US); William J. Jones, Barrington, IL (US); Ronald M. Gafron, Hoffman Estates, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 0 days.

(21) Appl. No.: 11/082,573

(22) Filed: Mar. 16, 2005

(65) Prior Publication Data
US 2005/0163362 A1 Jul. 28, 2005

Related U.S. Application Data

(60) Continuation of application No. 10/042,675, filed on Jan. 9, 2002, now Pat. No. 6,996,263, which is a continuation of application No. 08/814,978, filed on Mar. 11, 1997, now Pat. No. 6,363,164, which is a continuation-in-part of application No. 08/664,262, filed on May 13, 1996, now Pat. No. 5,982,918, application No. 11/082,573, which is a continuation of application No. 10/393,867, filed on Mar. 20, 2003, which is a division of application No. 09/059,813, filed on Apr. 14, 1998, now Pat. No. 6,661,910.

(60) Provisional application No. 60/053,606, filed on Jul. 22, 1997, provisional application No. 60/043,516, filed on Apr. 14, 1997, provisional application No. 60/031,604, filed on Nov. 27, 1996.

(51) Int. Cl.
*G06K 9/00* (2006.01)

(52) U.S. Cl. ........................ 382/135; 194/206; 235/379

(58) Field of Classification Search ................ 382/135, 382/136, 137, 138, 139, 140, 305, 310, 311; 370/392; 194/203, 205, 206, 208, 209–215, 194/219, 221, 224, 340, 341; 209/534; 235/379; 705/42, 45
See application file for complete search history.

(56) References Cited

U.S. PATENT DOCUMENTS 5,163,672 A 11/1992 Mennie ...................... 271/187

(Continued)

FOREIGN PATENT DOCUMENTS

WO WO 91/11778 8/1991

(Continued)

OTHER PUBLICATIONS

U.S. Appl. No. 09/611,279, filed Jul. 6, 2000, Method for Document Processing.

(Continued)

*Primary Examiner*—Matthew C. Bella
*Assistant Examiner*—Abolfazl Tabatabai
(74) *Attorney, Agent, or Firm*—Jenkens & Gilchrist, PC

(57) ABSTRACT

A document processing system comprises an input receptacle for receiving documents. A transport mechanism receives the documents from the input receptacle and transports the documents past an image scanner and a discrimination unit. An output receptacle receives the documents from the transport mechanism after being transported past the image scanner and the discrimination unit. The image scanner obtains an image of the documents, obtains an image of a selected area of the documents, and obtains information contained in the selected area of the document. The discrimination unit determines the authenticity of the document. A system controller directs the flows of documents over the transport mechanism.

64 Claims, 15 Drawing Sheets

U.S. PATENT DOCUMENTS

| | | | |
|---|---|---|---|
| 5,207,788 A | 5/1993 | Geib et al. ................. | 271/122 |
| 5,274,641 A * | 12/1993 | Shobatake et al. .......... | 370/392 |
| 5,295,196 A | 3/1994 | Raterman et al. .............. | 382/7 |
| 5,363,949 A | 11/1994 | Matsubayashi | |
| 5,444,794 A * | 8/1995 | Uhland, Sr. .................. | 705/45 |
| 5,467,405 A | 11/1995 | Raterman et al. ........... | 382/135 |
| 5,467,406 A | 11/1995 | Graves et al. ............... | 382/135 |
| D369,984 S | 5/1996 | Larsen ....................... | D10/97 |
| 5,602,936 A * | 2/1997 | Green et al. ................. | 382/140 |
| 5,633,949 A | 5/1997 | Graves et al. ............... | 382/135 |
| 5,640,463 A | 6/1997 | Csulits ....................... | 382/135 |
| 5,652,802 A | 7/1997 | Graves et al. ............... | 382/135 |
| 5,687,963 A | 11/1997 | Mennie ...................... | 271/119 |
| 5,692,067 A | 11/1997 | Raterman et al. ........... | 382/135 |
| 5,704,491 A | 1/1998 | Graves ....................... | 209/534 |
| 5,724,438 A | 3/1998 | Graves ....................... | 382/135 |
| 5,751,840 A | 5/1998 | Raterman et al. ........... | 382/135 |
| 5,790,693 A | 8/1998 | Graves et al. ............... | 382/135 |
| 5,790,697 A | 8/1998 | Jones et al. ................. | 382/135 |
| 5,806,650 A | 9/1998 | Mennie et al. .............. | 194/206 |
| 5,815,592 A | 9/1998 | Mennie et al. .............. | 382/135 |
| 5,822,448 A | 10/1998 | Graves et al. ............... | 382/135 |
| 5,832,104 A | 11/1998 | Graves et al. ............... | 382/135 |
| 5,867,589 A | 2/1999 | Graves et al. ............... | 382/135 |
| 5,870,487 A | 2/1999 | Graves et al. ............... | 382/135 |
| 5,875,259 A | 2/1999 | Mennie et al. .............. | 382/135 |
| 5,905,810 A | 5/1999 | Jones et al. ................. | 382/135 |
| 5,909,502 A | 6/1999 | Mazur ........................ | 382/135 |
| 5,909,503 A | 6/1999 | Graves et al. ............... | 382/135 |
| 5,912,982 A | 6/1999 | Munro et al. ................ | 382/135 |
| 5,938,044 A | 8/1999 | Weggesser .................. | 209/534 |
| 5,940,623 A | 8/1999 | Watts et al. ................. | 395/712 |
| 5,943,655 A | 8/1999 | Jacobsen ..................... | 705/30 |
| 5,960,103 A | 9/1999 | Graves et al. ............... | 382/135 |
| 5,966,456 A | 10/1999 | Jones et al. ................. | 382/135 |
| 5,982,918 A | 11/1999 | Mennie et al. .............. | 382/135 |
| 5,992,601 A | 11/1999 | Mennie et al. .............. | 194/207 |
| 6,012,565 A | 1/2000 | Mazur ........................ | 194/207 |
| 6,021,883 A | 2/2000 | Casanova et al. ........... | 194/217 |
| 6,026,175 A | 2/2000 | Munro et al. ................ | 382/135 |
| 6,028,951 A | 2/2000 | Raterman et al. ........... | 382/135 |
| 6,039,645 A | 3/2000 | Mazur ........................ | 453/10 |
| 6,068,194 A | 5/2000 | Mazur ........................ | 235/492 |
| 6,072,896 A | 6/2000 | Graves et al. ............... | 382/135 |
| 6,073,744 A | 6/2000 | Raterman et al. ........... | 194/207 |
| 6,074,334 A | 6/2000 | Mennie et al. .............. | 493/438 |
| 6,097,834 A * | 8/2000 | Krouse et al. ................ | 382/137 |
| 6,128,402 A | 10/2000 | Jones et al. ................. | 382/135 |
| 6,181,837 B1 * | 1/2001 | Cahill et al. ................. | 382/305 |
| 6,220,419 B1 | 4/2001 | Mennie ...................... | 194/207 |
| 6,237,739 B1 | 5/2001 | Mazur et al. ................ | 194/207 |
| 6,241,069 B1 | 6/2001 | Mazur et al. ................ | 194/207 |
| 6,256,407 B1 | 7/2001 | Mennie et al. .............. | 382/135 |
| 6,278,795 B1 | 8/2001 | Anderson et al. ........... | 382/135 |
| 6,311,819 B1 | 11/2001 | Stromme et al. ............ | 194/207 |
| 6,318,537 B1 | 11/2001 | Jones et al. ................. | 194/346 |
| 6,351,551 B1 | 2/2002 | Munro et al. ................ | 382/135 |
| 6,363,164 B1 | 3/2002 | Jones et al. ................. | 382/135 |
| 6,371,303 B1 | 4/2002 | Klein et al. ................. | 209/534 |
| 6,378,683 B2 | 4/2002 | Mennie ...................... | 194/207 |
| 6,381,354 B1 | 4/2002 | Mennie et al. .............. | 382/135 |
| 6,398,000 B1 | 6/2002 | Jenrick et al. ............... | 194/200 |
| 6,459,806 B1 | 10/2002 | Raterman et al. ........... | 382/135 |
| 6,460,705 B1 | 10/2002 | Hallowell ................... | 209/534 |
| 6,493,461 B1 | 12/2002 | Mennie et al. .............. | 382/135 |
| 6,539,104 B1 | 3/2003 | Raterman et al. ........... | 382/135 |
| 6,560,355 B2 | 5/2003 | Graves et al. ............... | 382/135 |
| 6,588,569 B1 | 7/2003 | Jenrick et al. ............... | 194/206 |
| 6,601,687 B1 | 8/2003 | Jenrick et al. ............... | 194/206 |
| 6,603,872 B2 | 8/2003 | Jones et al. ................. | 382/135 |
| 6,621,919 B2 | 9/2003 | Mennie et al. .............. | 382/135 |
| 6,628,816 B2 | 9/2003 | Mennie et al. .............. | 382/135 |
| 6,636,624 B2 | 10/2003 | Raterman et al. ........... | 382/135 |
| 6,647,136 B2 | 11/2003 | Jones et al. ................. | 382/137 |
| 6,650,767 B2 | 11/2003 | Jones et al. ................. | 382/135 |
| 6,654,486 B2 | 11/2003 | Jones et al. ................. | 382/135 |
| 6,661,910 B2 | 12/2003 | Jones et al. ................. | 382/135 |
| 6,665,431 B2 | 12/2003 | Jones et al. ................. | 382/135 |
| 6,678,401 B2 | 1/2004 | Jones et al. ................. | 382/135 |
| 6,678,402 B2 | 1/2004 | Jones et al. ................. | 382/135 |
| 6,705,470 B2 | 3/2004 | Klein et al. ................. | 209/534 |
| 6,721,442 B1 | 4/2004 | Mennie et al. .............. | 382/135 |
| 6,724,926 B2 | 4/2004 | Jones et al. ................. | 382/135 |
| 6,724,927 B2 | 4/2004 | Jones et al. ................. | 382/135 |
| 6,731,785 B1 | 5/2004 | Mennie et al. .............. | 382/135 |
| 6,731,786 B2 | 5/2004 | Jones et al. ................. | 382/135 |
| 6,748,101 B1 | 6/2004 | Jones et al. ................. | 382/135 |
| 6,778,693 B2 | 8/2004 | Jones et al. ................. | 382/136 |
| 6,798,899 B2 | 9/2004 | Mennie et al. ........... | 271/10.09 |
| 6,810,137 B2 | 10/2004 | Jones et al. ................. | 382/137 |
| 6,843,418 B2 | 1/2005 | Jones et al. ............. | 235/462.01 |
| 6,860,375 B2 | 3/2005 | Hallowell et al. ........... | 194/328 |
| 6,866,134 B2 | 3/2005 | Stromme et al. ............ | 194/207 |
| 6,868,954 B2 | 3/2005 | Stromme et al. ............ | 194/207 |
| 6,880,692 B1 | 4/2005 | Mazur et al. ................ | 194/207 |
| 6,913,130 B1 | 7/2005 | Mazur et al. ................ | 194/207 |
| 6,913,260 B2 | 7/2005 | Maier et al. ............ | 271/265.04 |
| 6,915,893 B2 | 7/2005 | Mennie .................. | 271/265.04 |
| 2001/0006557 A1 | 7/2001 | Mennie et al. .............. | 382/135 |
| 2001/0015311 A1 | 8/2001 | Mennie ...................... | 194/207 |
| 2001/0019624 A1 | 9/2001 | Raterman et al. ........... | 382/135 |
| 2001/0035603 A1 | 11/2001 | Graves et al. .......... | 271/265.01 |
| 2002/0001393 A1 | 1/2002 | Jones et al. ................. | 382/135 |
| 2002/0020603 A1 | 2/2002 | Jones et al. ................. | 194/346 |
| 2002/0056605 A1 | 5/2002 | Mazur et al. ................ | 194/207 |
| 2002/0085245 A1 | 7/2002 | Mennie et al. .............. | 382/135 |
| 2002/0085745 A1 | 7/2002 | Jones et al. ................. | 382/135 |
| 2002/0103757 A1 | 8/2002 | Jones et al. ................. | 382/135 |
| 2002/0104785 A1 | 8/2002 | Klein et al. ................. | 209/534 |
| 2002/0107801 A1 | 8/2002 | Jones et al. ................. | 382/137 |
| 2002/0118871 A1 | 8/2002 | Jones et al. ................. | 382/135 |
| 2002/0122580 A1 | 9/2002 | Jones et al. ................. | 382/135 |
| 2002/0126885 A1 | 9/2002 | Mennie et al. .............. | 382/135 |
| 2002/0126886 A1 | 9/2002 | Jones et al. ................. | 382/135 |
| 2002/0131630 A1 | 9/2002 | Jones et al. ................. | 382/135 |
| 2002/0136442 A1 | 9/2002 | Jones et al. ................. | 382/135 |
| 2002/0145035 A1 | 10/2002 | Jones ......................... | 235/379 |
| 2002/0154804 A1 | 10/2002 | Jones et al. ................. | 382/135 |
| 2002/0154805 A1 | 10/2002 | Jones et al. ................. | 382/135 |
| 2002/0154806 A1 | 10/2002 | Jones et al. ................. | 382/135 |
| 2002/0154807 A1 | 10/2002 | Jones et al. ................. | 382/135 |
| 2002/0154808 A1 | 10/2002 | Jones et al. ................. | 382/135 |
| 2002/0186876 A1 | 12/2002 | Jones et al. ................. | 382/135 |
| 2003/0009420 A1 | 1/2003 | Jones ......................... | 705/39 |
| 2003/0015395 A1 | 1/2003 | Hallowell et al. ........... | 194/206 |
| 2003/0015396 A1 | 1/2003 | Mennie ...................... | 194/206 |
| 2003/0059098 A1 | 3/2003 | Jones et al. ................. | 382/135 |
| 2003/0062242 A1 | 4/2003 | Hallowell et al. ........... | 194/302 |
| 2003/0081824 A1 | 5/2003 | Mennie et al. .............. | 382/135 |
| 2003/0108233 A1 | 6/2003 | Raterman et al. ........... | 382/135 |
| 2003/0121753 A1 | 7/2003 | Stromme et al. ............ | 194/207 |
| 2003/0121852 A1 | 7/2003 | Stromme et al. ............ | 194/207 |
| 2003/0132281 A1 | 7/2003 | Jones et al. ................. | 235/379 |
| 2003/0139994 A1 | 7/2003 | Jones ......................... | 705/36 |
| 2003/0168308 A1 | 9/2003 | Maier et al. ................ | 194/207 |
| 2003/0174874 A1 | 9/2003 | Raterman et al. ........... | 382/135 |
| 2003/0182217 A1 | 9/2003 | Chiles ........................ | 705/35 |
| 2003/0198373 A1 | 10/2003 | Raterman et al. ........... | 382/135 |
| 2003/0202690 A1 | 10/2003 | Jones et al. ................. | 382/139 |
| 2004/0003980 A1 | 1/2004 | Hallowell et al. ........... | 194/206 |
| 2004/0016621 A1 | 1/2004 | Jenrick et al. ............... | 194/206 |
| 2004/0016797 A1 | 1/2004 | Jones et al. ............. | 235/462.01 |
| 2004/0028266 A1 | 2/2004 | Jones et al. ................. | 382/135 |
| 2004/0083149 A1 | 4/2004 | Jones ......................... | 705/35 |

| | | | |
|---|---|---|---|
| 2004/0145726 A1 | 7/2004 | Csulits et al. ............... 356/71 |
| 2004/0149538 A1 | 8/2004 | Sakowski ................. 194/207 |
| 2004/0153408 A1 | 8/2004 | Jones et al. ................. 705/43 |
| 2004/0154964 A1 | 8/2004 | Jones ...................... 209/534 |
| 2004/0173432 A1 | 9/2004 | Jones |
| 2004/0182675 A1 | 9/2004 | Long et al. |
| 2004/0251110 A1 | 12/2004 | Jenrick et al. |
| 2005/0029168 A1 | 2/2005 | Jones et al. ............... 209/534 |
| 2005/0035034 A1 | 2/2005 | Long |
| 2005/0040225 A1 | 2/2005 | Csulits et al. ............. 235/379 |
| 2005/0047642 A1 | 3/2005 | Jones et al. |
| 2005/0060055 A1 | 3/2005 | Hallowell ................. 700/213 |
| 2005/0060059 A1 | 3/2005 | Klein et al. ............... 700/213 |
| 2005/0060061 A1 | 3/2005 | Jones ...................... 700/226 |
| 2005/0077142 A1 | 4/2005 | Tam et al. ................. 194/217 |
| 2005/0086271 A1 | 4/2005 | Jones et al. ............... 707/200 |
| 2005/0087422 A1 | 4/2005 | Maier et al. ............... 194/207 |
| 2005/0108165 A1 | 5/2005 | Jones et al. |
| 2005/0117791 A2 | 6/2005 | Raterman et al. .......... 382/135 |
| 2005/0117792 A2 | 6/2005 | Raterman et al. .......... 382/135 |
| 2005/0150738 A1 | 7/2005 | Jones et al. ............... 382/135 |
| 2005/0163361 A1 | 7/2005 | Jones et al. ............... 382/135 |
| 2005/0163362 A1 | 7/2005 | Jones et al. ............... 382/137 |
| 2005/0169511 A1 | 8/2005 | Jones ...................... 382/135 |
| 2005/0173221 A1 | 8/2005 | Maier et al. ............... 194/207 |

FOREIGN PATENT DOCUMENTS

| | | |
|---|---|---|
| WO | WO 92/17394 | 10/1992 |
| WO | WO 93/23824 | 11/1993 |
| WO | WO 95/24691 | 9/1995 |
| WO | WO 96/10800 | 4/1996 |
| WO | WO 96/36933 | 11/1996 |
| WO | WO 97/30422 | 8/1997 |
| WO | WO 97/43734 | 11/1997 |
| WO | WO 97/45810 | 12/1997 |
| WO | WO 98/12662 | 3/1998 |
| WO | WO 98/13785 | 4/1998 |
| WO | WO 98/24052 | 6/1998 |
| WO | WO 98/24067 | 6/1998 |
| WO | WO 98/35323 | 8/1998 |
| WO | WO 98/40839 | 9/1998 |
| WO | WO 98/47100 | 10/1998 |
| WO | WO 98/50892 | 11/1998 |
| WO | WO 98/59323 | 12/1998 |
| WO | WO 99/09511 | 2/1999 |
| WO | WO 99/14668 | 3/1999 |
| WO | WO 99/23601 | 5/1999 |
| WO | WO 99/41695 | 8/1999 |
| WO | WO 99/48040 | 9/1999 |
| WO | WO 99/48042 | 9/1999 |
| WO | WO 00/24572 | 5/2000 |
| WO | WO 01/08108 | 2/2001 |
| WO | WO 01/59685 | 8/2001 |
| WO | WO 01/59723 | 8/2001 |
| WO | WO 02/29735 | 4/2002 |
| WO | WO 02/054360 | 7/2002 |
| WO | WO 03/005312 | 1/2003 |
| WO | WO 03/028361 | 4/2003 |
| WO | WO 03/029913 | 4/2003 |
| WO | WO 03/030113 | 4/2003 |
| WO | WO 03/067532 | 8/2003 |
| WO | WO 03/107282 | 12/2003 |
| WO | WO 04/010367 | 1/2004 |
| WO | WO 04/027717 | 4/2004 |
| WO | WO 04/036508 | 4/2004 |
| WO | WO 04/038631 | 5/2004 |
| WO | WO 04/068422 | 8/2004 |
| WO | WO 05/013209 A2 | 2/2005 |
| WO | WO 05/017842 A1 | 2/2005 |
| WO | WO 05/029240 A2 | 3/2005 |
| WO | WO 05/036445 A1 | 4/2005 |
| WO | WO 04/041134 A2 | 5/2005 |

OTHER PUBLICATIONS

U.S. Appl. No. 09/635,967, filed Aug. 10, 2000, Method and Apparatus for Document Processing.

U.S. Appl. No. 09/655,481, filed Sep. 5, 2000, Method and Apparatus for Discriminating and Counting Documents.

U.S. Appl. No. 09/684,103, filed Oct. 5, 2000, Method and Apparatus for Document Identification and Authentication.

U.S. Appl. No. 10/264,338, filed Oct. 3, 2002, Automatic Currency Processing System.

U.S. Appl. No. 10/263,622, filed Oct. 3, 2002, Automatic Currency Processing System.

U.S. Appl. No. 10/853,021, filed May 22, 2004, An Automated Document Processing System Using Full Image Scanning.

U.S. Appl. No. 10/996,693, filed Nov. 24, 2004, Currency Processing System with Fitness Detection.

U.S. Appl. No. 10/036,686, filed Jan. 14, 2005, Currency Processing Device, Method and System.

U.S. Appl. No. 10/048,416, filed Feb. 1, 2005, Automated Document Processing System And Method Using Image Scanning.

U.S. Appl. No. 10/048,296, filed Feb. 1, 2005, Automated Document Processing System And Method Using Full Image Scanning.

U.S. Appl. No. 10/057,825, filed Feb. 14, 2005, Method and Apparatus for Discriminating and Counting Documents.

U.S. Appl. No. 11/137,295, filed May 24, 2005, Currency Processing Device.

* cited by examiner

AUTOMATED CHECK PROCESSING SYSTEM WITH CHECK IMAGING AND ACCOUNTING

RELATED APPLICATIONS

This application is a continuation of U.S. application Ser. No. 10/042,675, filed Jan. 9, 2002 now U.S. Pat. No. 6,996,263, which is a continuation of U.S. application Ser. No. 08/814,978, filed Mar. 11, 1997 now U.S. Pat. No. 6,363,164; which is a complete application claiming the benefit of U.S. application Ser. No. 60/031,604, filed Nov. 27, 1996, and further is also a continuation of U.S. application Ser. No. 10/393,867 filed Mar. 20, 2003, which is a divisional of U.S. application Ser. No. 09/059,813 filed Apr. 14, 1998 now U.S. Pat. No. 6,661,910, which is a complete application claiming the benefit of U.S. application Ser. Nos. 60/043,516 filed Apr. 14, 1997 and 60/053,606, filed Jul. 22, 1997. The '978 application is a continuation-in-part of U.S. application Ser. No. 08/664,262, filed May 13, 1996, now issued as U.S. Pat. No. 5,982,918. The disclosures of each of the foregoing applications are incorporated by reference herein in their entireties.

FIELD OF INVENTION

The present invention relates to check processing systems and, more particularly, to check processing systems which receive a check, image the check, transmit the check image to an accounting system and adjust an account associated with the check.

SUMMARY OF THE INVENTION

An embodiment of the present invention is a system for processing checks comprising an image processing device that receives a paper check, scans the received paper check to create a check image of at least one side of the paper check and obtains check information relating to the scanned paper check. A communications link is provided over which the check image and obtained check information is communicated. An accounting system connected to the communications link is operable to update a financial account associated with the paper check in response to the obtained and communicated check information.

Another embodiment of the invention is a check processing network comprising a plurality of check imaging devices, each such device receiving paper checks, scanning the received paper checks to create check images of at least one side of the paper checks and obtaining check information relating to the scanned paper checks. A financial institution accounting system operates to receive the check images and update financial accounts associated with the paper checks in response to the obtained check information. A data communications network interconnects the plurality of check imaging devices and the financial institution accounting system.

Another embodiment is a method for processing checks comprising scanning, at a first location, a paper check to create an electronic check image, truncating further processing of the paper check after scanning, obtaining information relating to the scanned paper check; electronically transmitting the electronic image and obtained check information to a second location; and reconciling at least one account associated with the paper check based on the electronically transmitted check information.

DETAILED DESCRIPTION OF THE PREFERRED EMBODIMENT

By "documents" it is meant to include checks, deposit slips, payment documents, savings withdrawal tickets, check deposit slips, savings deposit slips, and all other documents utilized as a proof of deposit at financial institutions. It is also meant by the term "documents" to include accounting invoices, debit forms, and account transfer forms.

By "accounting system" or "outside accounting system," it is meant to include the hardware and software associated with accessing, maintaining, tracking, and updating savings accounts, checking accounts, credit card accounts, business and commercial loans, consumer payments, and all other similar accounts at locations remotely located from the full image scanners. The term includes three broad types of systems: systems where deposits are made; systems where withdrawals are made; and systems where both deposits and withdrawals are made. Although the accounting system described herein is described as being employed at a financial institution such as a bank, it will be understood that any business, public or private institution, or individual can employ an outside accounting system to process transactions. By "financial institution," it is meant to include savings and loans, investment houses, and all other types of financial institutions whether private, public, or government. The following description is in terms of banks but it also includes all financial institutions as well.

Figure 1:
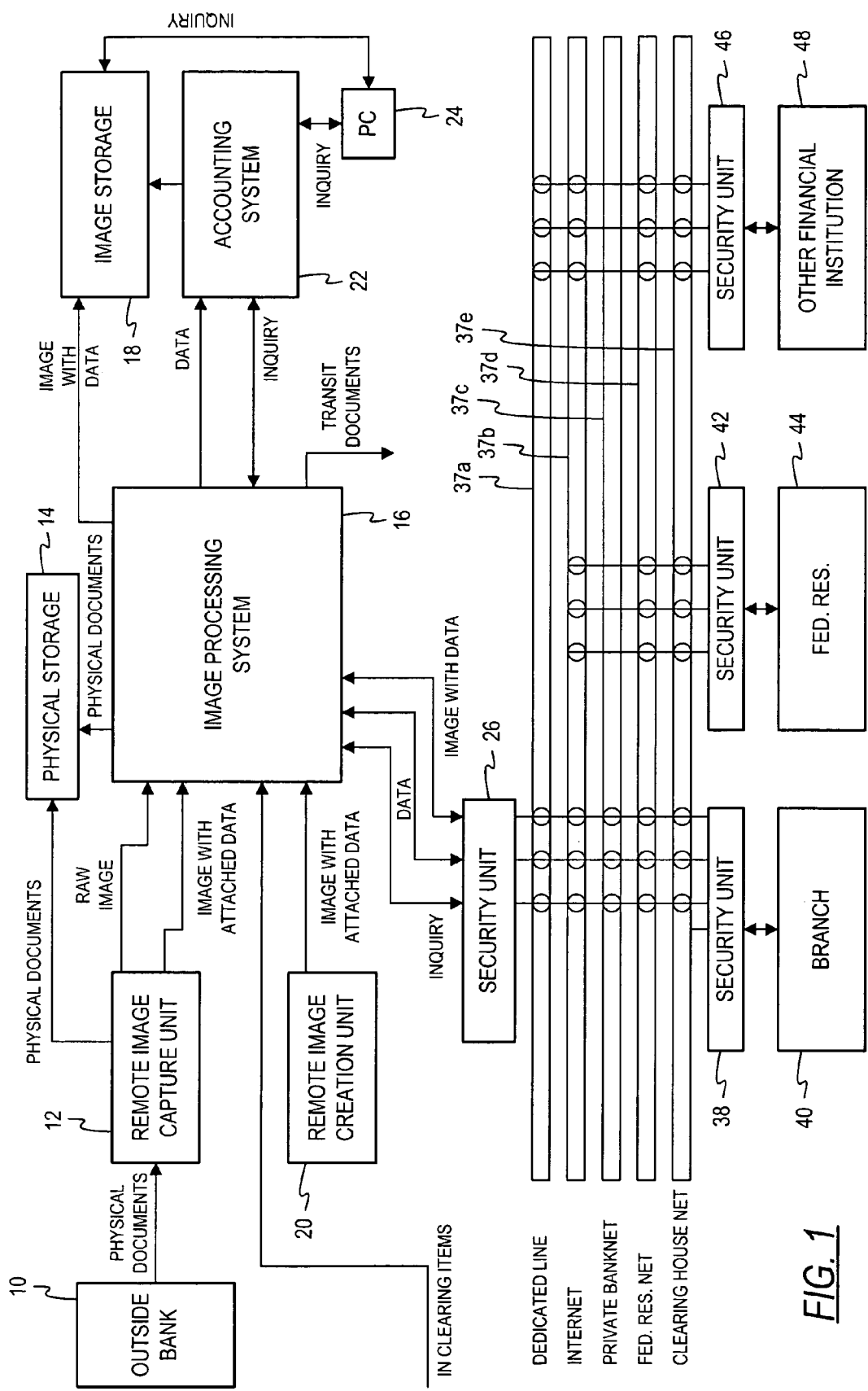
FIG. 1 is a block diagram of an image processing network.

Referring now to an image processing network as illustrated in FIG. 1, documents are scanned at a remote image capture unit 12. The remote image capture unit 12, as will be explained in greater detail below, is preferably a low-cost scanning unit that obtains an image of both sides of the document.

Figure 2:
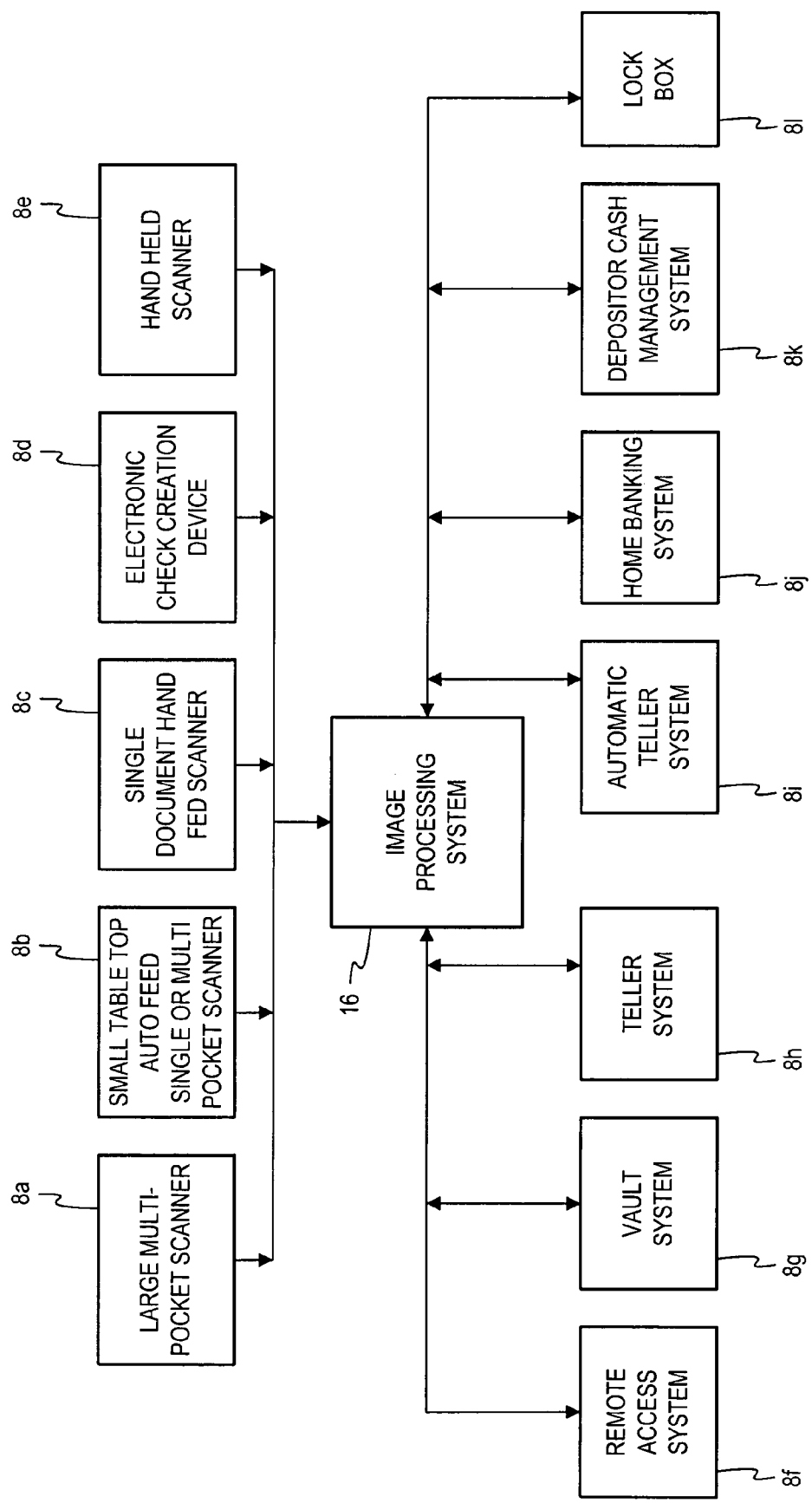
FIG. 2 is a block diagram of units which comprise the image processing network.

However, the remote image capture unit 12 may be a variety of machines including a large multi-pocket scanner, a small table-top scanner, a single document hand-fed scanner, and a hand-held scanner. For example, with reference to FIG. 2, the remote image capture unit 12 may be replaced by a remote image capture network 7 which comprises a plurality of remote image capture units.

The remote image capture network 7 includes a large multi-pocket scanner 8a. Using image sensors, the large multi-pocket scanner 8a captures images of one or both sides of documents, converts the images to digital signals, and sends these signals to be processed either at other units (described below) within the remote image capture network 7 or at an image processing system 16.

The remote image capture network 7 further includes a small table-top scanner 8b. In contrast to the large multi-pocket scanner 8a, the small table-top scanning device 8b is compact and can be conveniently located in the corner of a room or on a table top.

Also, the remote image capture network 7 includes a single document hand-fed scanner 8c. The single document scanner 8c is preferably a compact device where the user feeds through documents one-at-a-time. The single document scanner 8c has the advantage of being less expensive to purchase than other scanning devices.

The remote image capture network 7 also includes an electronic document creation device 8d. The electronic document creation device 8d comprises hardware and software which automatically creates an image of a document, for example, a check. The document creation device also preferably contains a specialized printer that is capable of printing documents which utilize special paper or ink, for example, checks.

Additionally, the remote image creation network 7 also includes a hand-held scanner 8e. The hand-held scanner 8e comprises a wand with which a user scans a document by moving a hand-held wand across the document. The wand is electrically coupled to a personal computer which has the necessary software to obtain and process the scanned image.

The above devices 8a–8e can be located as stand-alone units or as one component in all types of teller systems such as a teller system 8h at a window, in a vault system 8g, an automatic teller machine (ATM) 8i, a home banking system 8j, a depositor cash management system 8k or a night teller (not shown), or a lock box 8l. Additionally, they may be connected as a local area network (LAN), metropolitan area network (MAN), or wide area network (WAN).

The above devices are included as part of the vault system 8g. The vault system 8g includes hardware and software which processes the amount and type of currency, documents, or coin entering or leaving a vault. The vault system includes any of the devices described above such as the large pocket scanner module, a table-top scanning device, a single document scanner, an electronic document creation device, or a hand-held scanner.

The above devices are also included as part of the teller system 8h. The teller system 8h processes documents, coin, and currency at the teller window and maintains a record of all types of documents, currency and coin transactions at the teller window. The teller system may include any of the modules described above such as a table-top scanning device, a single document scanner, an electronic image document creation device, or a hand-held scanner. The teller system also has a video monitor to view images of documents or currency obtained anywhere in the image processing network or at the teller window.

The above image processing devices may be included in an automated teller machine (ATM) 8i. The ATM 8i processes all types of deposits involving all types of documents, currency, and types of coin in real-time from remote accounting systems and obtains full images of each document and all currency processed. The ATM 8i can also accept and transfer funds to all types of magnetic media such as smart cards. The ATM 8i also has a video monitor to view images of documents or currency obtained anywhere in the image processing network.

The above devices are also connected as part of a home banking system 8j. The home banking system 8j comprises hardware and software that allows a customer to check account balances, obtain images of deposited documents, and create images of documents. The home banking system 8j may include any of the other modules described above such as a single document scanner, an electronic document creation device, or a hand-held scanner. The home banking system 8j also has a video monitor to view images of documents obtained anywhere in the image processing network.

The devices mentioned above are further connected as part of a depositor cash management system 8k. The depositor cash management system 8k may include devices in one location or at several locations. The depositor cash management system 8k includes hardware and software to obtain images of documents, process these images, obtain transaction information, and perform any other functions associated with an accounting system. The depositor cash management system 8k may include any of the other modules described above such as the large multi-pocket scanner module, a table-top scanning device, a single document scanner, an electronic document creation device, or a hand-held scanner. The depositor cash management system 8k also has a video monitor or monitors to view images of documents obtained anywhere in the image processing network.

With reference again to FIG. 1, one function provided within the network is proof-of-deposit processing. Proof-of-deposit processing ensures that for a given transaction, debits equal credits. As described below, POD processing, CAR/LAR processing, or any other type of processing can occur at the remote unit or at a central location. Thus, images can be transported from any point in the network (including a central location) and processed at any other location in the network.

Shortly after the images are captured by the remote capture unit 12, they are transmitted to the proof of deposit area (within that unit or at a central location). It is important that the transaction be proved shortly after it occurs if the remote capture unit is at the teller window, automatic teller machine or depositor site. Tellers or a customer's clerical staff have access to all the images for the transactions handled that day and can correct any errors occurring that same day.

The remote capture unit 12 preferably contains hardware and software to detect and process counterfeit documents. Each remote capture unit assembles a running total of non-counterfeit documents for a given transaction, allowing a customer to know when a counterfeit has been detected. Counterfeits are held and deducted from totals so customers can know about that immediately.

Remote scanners can be placed at various locations, for example teller windows. Checks and other document images will be captured by these remote image scanners. The images are forwarded to a central location where proof-ofdeposit processing occurs. Additionally, the financial institution could choose to process the image immediately at the central location or the financial institution could store the images for a period of time in some kind of electronic reservoir for proof of depositing at a later time. Processing the images at a central location has the advantage of not slowing down service at the remote location. For example, central processing reduces lines and excessive waiting for bank customers.

Documents that cannot be read by the remote capture unit ("no-reads") will be returned to the depositor. Alternatively, the remote image capture device can accept the document and display the image for a bank employee to key in the amount. This could be done as the deposit is being entered into the automatic teller machine or later. The deposit does not have to be proved while the depositor is at the automatic teller machine or the teller window. Since all of the items entered are stored as images, an account can be adjusted later. Alternatively, the customer may be prompted to enter the missing data. In this case the image file may be tagged for later verification.

Documents whose images are captured at remote capture units located at large retail and commercial depositor's place of business will be processed as at a teller window. All items are sent to the bank, until all banks are able to receive images. They would be processed on check processing machines to separate the on-us items from transit items and to power encode the transit items.

It should be realized that the above imaging network can be used for all or part of a bank or financial institution's document processing needs. For example, some banks may choose to process only checks. Additionally, a bank might use this for on-us checks or for on-us checks of under $100. These checks would be scanned at the branch location or the ATM location. These low value checks would then be immediately destroyed because the bank could utilize the captured image. However, all on-us checks in excess of $100 and all transit checks would be handled under the current system. The bank will hold certain checks over a certain value for a longer period of time before destroying or returning the check. Thus, the present invention can be used in combination with current physical document processing.

Figure 3:
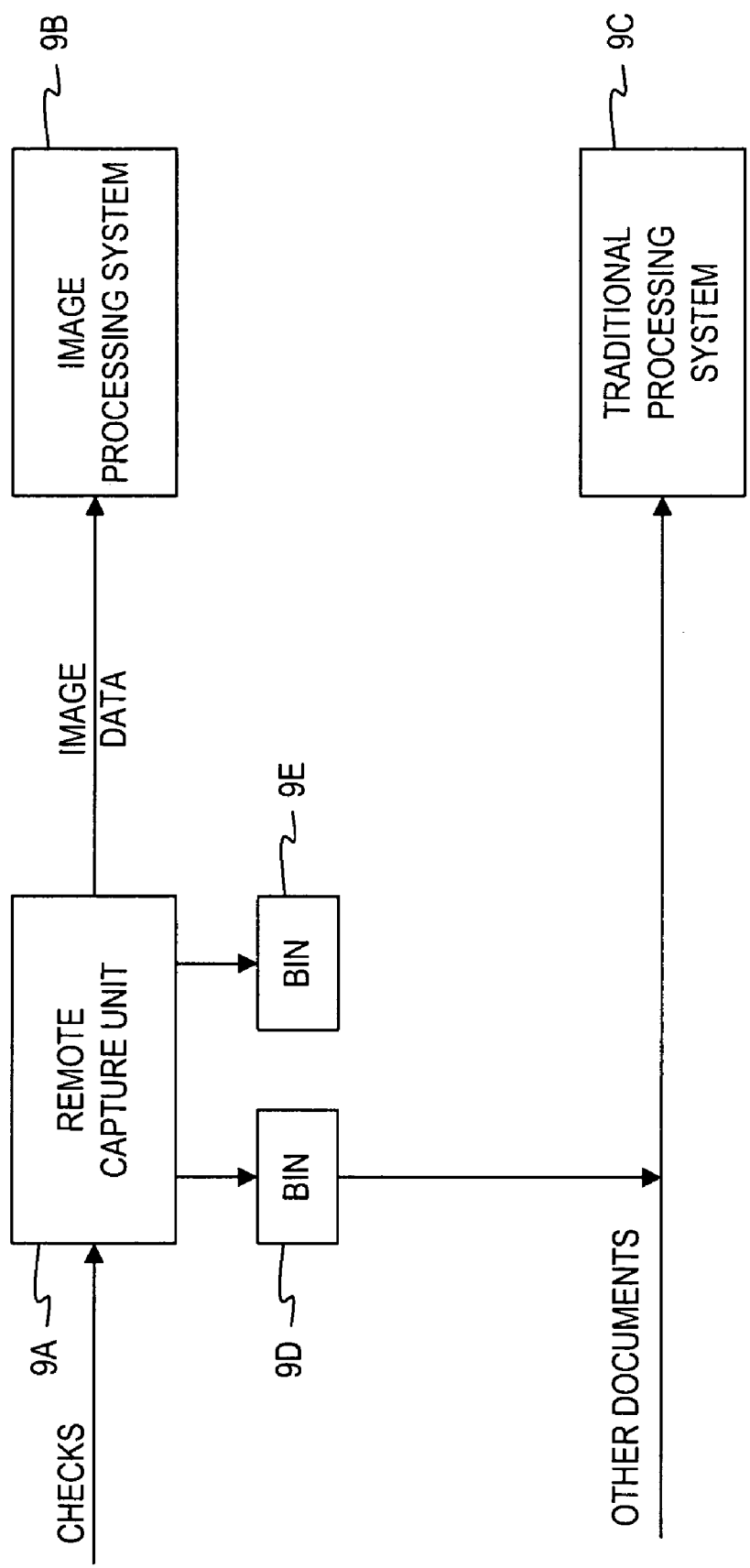
FIG. 3 is a block diagram of an image processing system used in combination with a traditional document processing system.

Referring now to FIG. 3, checks are fed through a remote capture unit 9a. The unit 9a operates like the remote capture unit 12 of FIG. 1 as described above and has plural output bins. The unit 9a scans each check and sorts the checks into the plural output bins based on whether the checks are going to be physically processed. As an example, the checks may be sorted based on determined check amount. For example, checks greater than $100 may be placed in a first bin 9d so that further physical processing of the checks can be made. All other checks are placed in a second bin 9e where they are later discarded (i.e., they are not further physically processed). The images of selected ones (perhaps based on bin sort) or all of the checks are sent to an image processing system 9b which operates as described below. The checks from the first bin 9d are physically transported to a traditional processing system 9c where they are processed using a traditional bank document processing system 9c. Other documents entering the system may be processed by the traditional processing system 9c.

The network of FIG. 1 can be configured to provide a combination of distributed and centralized image processing. That is, remote image capture units 12 may supply images to an image processing system 16 at a remote location (e.g., a bank branch) where image processing is accomplished. Additionally, central processing locations may exist where the physical checks and/or images are processed as is known to those skilled in the art. As a specific example, a bank might have remote units located at various bank branches. At the same time, certain customers may continue to send their check images to a central location for processing. Additionally, certain customers may choose to send checks having a value over a predetermined amount, such as $100, to a central location for processing.

The remote image capture unit 12 may accept physical documents from a bank system 10 which does not process the images of documents. The documents are moved to the remote image capture unit 12 where they are processed.

The remote image capture unit 12 provides either "raw" image data or an image file to the image processing system 16. Raw image data is unformatted data that is sent as a series a binary digits. Raw image data is transmitted from remote image capture units which lack the capability to process the raw data into an image file. The raw data is sent to the image processing system 16 where processing is accomplished, as described below.

The image processing system 16 also accepts image files from a remote image creation device 20. The remote image creation device 20 creates images of documents. For example, the remote image creation device 20 can create the image of a check. The remote image creation units use software to create the image and prompt the user for information to complete the image such as the transaction amount and the payee.

The image processing system 16 also accepts inclearing items. The inclearing image processing area accepts images in the format of the file described above. The inclearing images comprise image files associated with "on-us" documents or, in addition, physical documents. In this way, the image processing system 16 is able to process both image files and physical documents. Additionally, if needed because other financial institutions can not process image files, transit documents are sent out of the image processing system 16 to other financial institutions.

The remote image capture unit 12, after processing the documents performs a sort, separates documents and sends some documents to physical storage 14. For example, if used by a bank, the remote image capture unit 12 will separate documents drawn on the financial institution ("on-us" documents) from documents drawn on other financial institutions ("transit" documents). In an alternate embodiment the documents are not separated but are destroyed.

The image processing system 16 accepts both raw image data and image files. As will be explained in greater detail below, the image processing system 16 sorts document image files into transit and on-us image files, performs proof-of-depositing functions, forms cash letters for transmission, and routes the out-going transit image files. Additionally, it may power-encode physical documents (if needed) and acts as a conduit for inquiries throughout the system.

The image processing system 16 sends image files to an image storage device 18 where they are stored. The image storage device 18 may be an optical storage device or a magnetic storage device, as is known in the art.

The storage device allows the system's owner (i.e., a bank) to make a full record of deposits. In other words, when the customer deposits the document, a full image picture of the front and back side of the document is deposited. This is advantageous at the teller window, and, in particular, when the remote capture device is an ATM which accepts bulk deposits. Therefore, if a dispute arises at a later date relative as to what was deposited into the ATM, there will be a full image record of the complete deposit. The customer can then review each document deposited. Therefore, the bank and customer can easily re-reconcile the deposit based upon the image record.

The image processing system 16 sends the data portion of the image file to an accounting system 22. As described above, the accounting system 22 includes the hardware and software associated with accessing, maintaining, tracking, and updating savings accounts, checking accounts, credit card accounts, business and commercial loans, consumer payments, and all other similar accounts at locations remotely located from the image processing system 16.

A personal computer (PC) 24 is coupled to the accounting system 22 and the image storage 18. The personal computer 24 contains software allowing the operator to make inquiries about a particular document. The inquiry comprises data representing the document identification number and the location within the network where the document is stored. The inquiry can also be routed through the accounting system 22 and the image processing system 16 and then through a security unit 26 onto a dedicated line 37*a*, an internet line 37*b*, a private banknet line 37*c*, a federal reserve network line 37*d* or a clearing house network line 37*e*. From these lines, the inquiry is routed over the particular network to the destination, as is known in the art. When received at the destination, the request is routed to particular hardware or software where the inquiry is serviced, that is, the destination responds to the request by answering that the entry was not found, that the user does not have access rights to the information, or with the image file (with a marking indicating that it was from an inquiry). Then, if the query is successful, the image data file is routed back (with the inquiry mark). It goes through security 26 and returns to the image processing system 16. Since it is marked, it is routed to the outside accounting system 22 and to the personal computer 24. At the personal computer 24, the contents of the image file are displayed.

The image processing system 16 transmits and receives inquiries, the data portion of the image file, and image files through the security unit 26. From the security unit 26, the inquiries, data and image files can traverse the dedicated line 37*a* internet line 37*b*, private banknet line 37*c*, federal reserve network line 37*d* and clearing house network line 37*e*. All of these lines are connected through security units 38, 42, and 46 to other bank branches 40, the federal reserve system 44, and other financial institution processing 48.

Figure 4A:
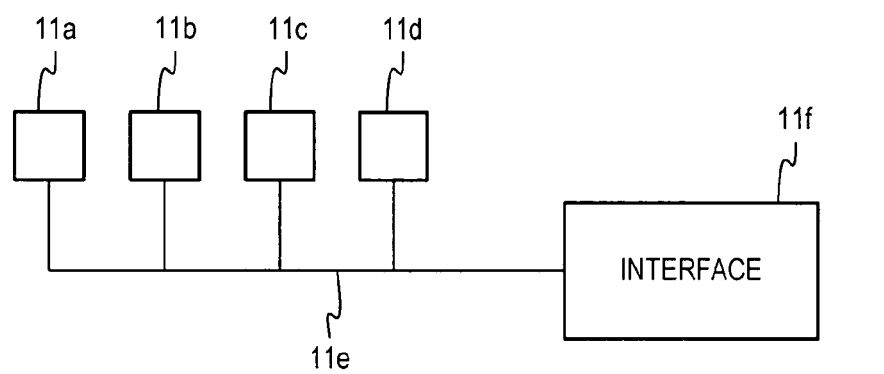
FIGS. 4a–4c show topologies for the interconnection of remote capture devices.

The devices on the remote image processing network are preferably connected to form a LAN. The physical layout or topology of the LAN can vary. For example, as illustrated in FIG. 4*a*, a series of remote units 11*a*, 11*b*, 11*c*, and 11*d* are connected to common bus 11*e*. Bus 11*e* connects the common bus to an interface 11*f* which accesses other networks. The "remote units" may include any combination of large multi-pocket scanners, small table top scanners, single document scanners, electronic document creation devices, handheld scanners, vault systems, teller systems, ATMs, home banking systems, or retail cash management systems. The bus-based network is inexpensive, reliable, and requires the least amount of cable for any LAN topology.

Figure 4B:
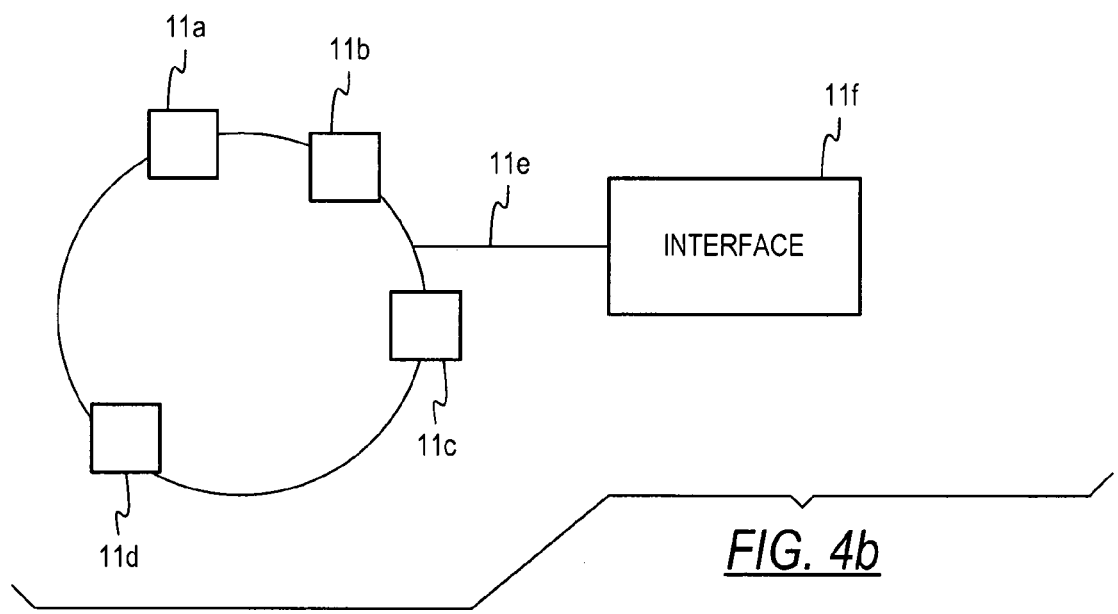

A LAN using a ring topology is illustrated in FIG. 4*b*. Remote units 11*a*, 11*b*, 11*c*, and 11*d* retransmit information to adjacent units using point-to-point links. The units communicate with other networks through an interface 11*f*. Although more expensive than the bus topology, the ring topology lends itself to being able to transmit over greater distances.

Figure 4C:
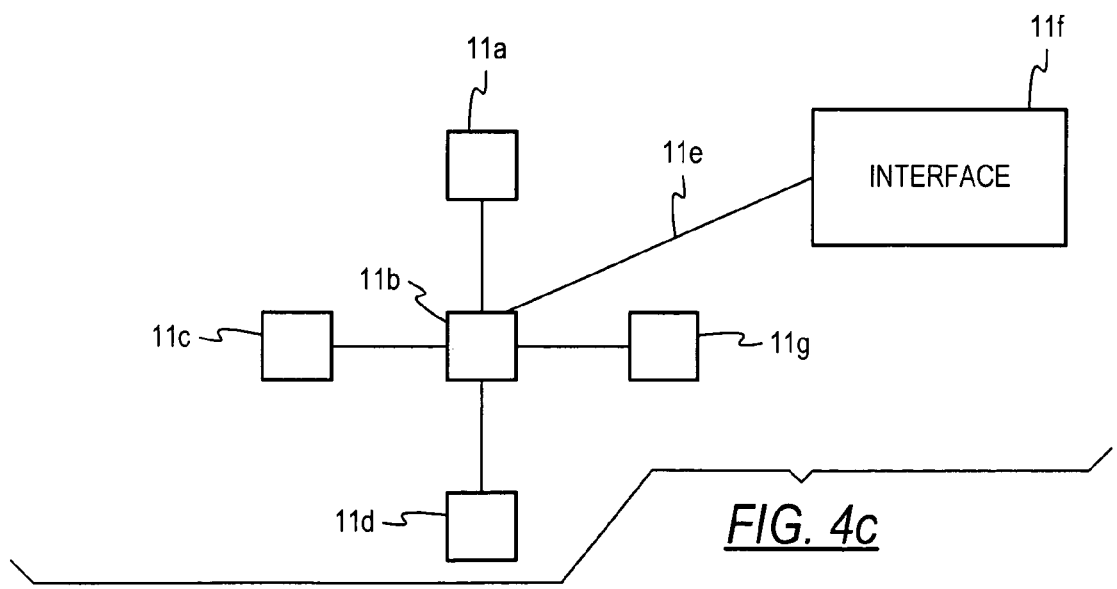

A LAN using a star topology is illustrated in FIG. 4*c* where a central remote unit 11*b* is connected to all other remote units 11*a*, 11*c*, 11*d*, and 11*g*. The central remote unit 11*b* communicates to other networks through an interface 11*f*. An advantage of the star topology is enhanced network management. Because all traffic passes the central unit 58, traffic monitoring is simple and detailed network reports are easy to produce. Enhanced security is inherently a part of this type of topology since the central unit can keep tables of user access rights as well as acceptable passwords. Also, the network can easily control who logs onto any remote device present on the network.

It will be understood by those skilled in the art that any combination of the above topologies can be used to construct the network. Thus, any of the units may be, themselves, networks of any topology.

Figure 5:
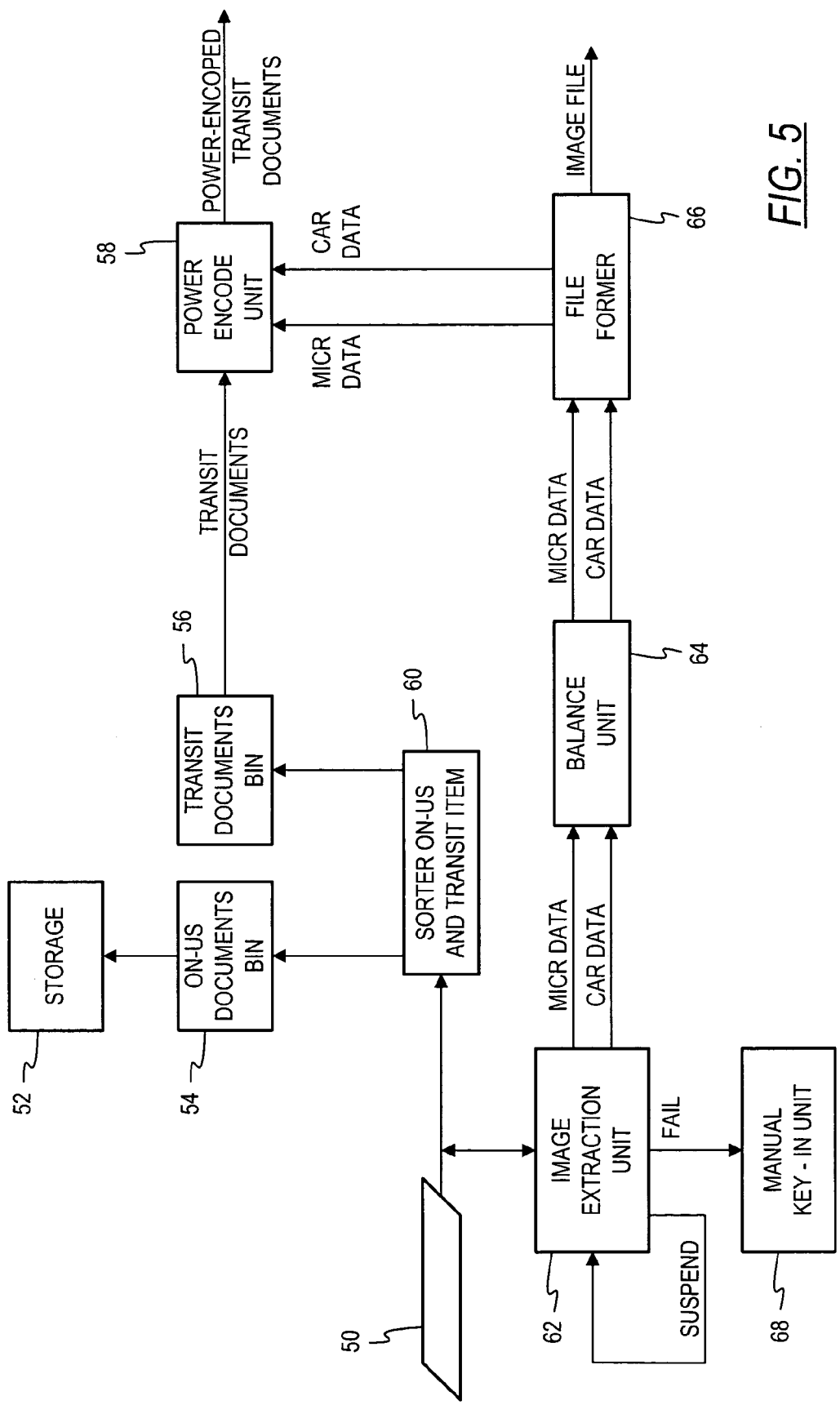
FIG. 5 is a block diagram of the remote capture unit.

Referring now to FIG. 5, with respect to the image capture unit 12, a document 50 is scanned by an image extraction unit 62. Preferably two heads are used to obtain full video images of both sides of the documents. However, the unit can have any number of heads and scan only one side of the document. Additionally, the document can be scanned in either the wide or the narrow direction. The image extraction unit 62 extracts portions of the image of the document for future processing. For example, in the case of a check, the image extraction unit 62 extracts MICR data, courtesy amount (CAR) data, and legal amount field (LAR) data. The image extraction unit 62 may also be configured to extract other data in the case of currency or other types of documents. The image extraction unit 62 sends a "suspend" signal to deactivate itself in the case of overflow of documents. The suspend signal starts a timer which, upon timeout, allows the image extraction unit 62 to resume operations. However, if the overflow condition still exists, then another suspend signal will deactivate the image extraction unit 62.

When the image extraction unit 62 fails to identify the required data, then a "fail" signal is sent to a manual key unit 68. An operator at the manual key unit 68 is alerted and then views the image of the document on a video terminal (not shown) and enters the missing data at the manual key unit 68.

The image extraction unit 62 sends the MICR data, CAR data, and LAR data to a balance unit 64. The purpose of the balancing unit 64 is to ensure that the amount recorded as the total of a transaction matches the individual amounts recorded. For example, a deposit may comprise ten checks. The purpose of the balance unit 64 is to ensure that the amounts recorded on a deposit slip as the total matches the total deposited as recorded by the extraction unit 62. The balance unit 64 also creates images of cash-in slips which are used to indicate the number of bills processed in a transaction. The cash-in and cash-out slips are created automatically as images and indicate the number of dollar bills handled both in and out which are printed on these receipts. The bank stores images of all documents and currency processed in every transaction. Thus, processing errors are easily detectable. Also, the stored images facilitate convincing the depositor that the transaction, as corrected by the bank, is correct.

The MICR, CAR, and LAR data is sent to the form image file unit 66 where an image file is formed. As mentioned above, the image file comprises an image portion and a data portion. The two portions are tied together by pointers which indicate the location and identity of the other portion. The image file is then sent to the image processing system.

In some networks, it will be necessary to sort "on-us" items and transit items, then send out (physically) the transit items. A sorter 60 sorts on-us and transit items. The on-us documents are placed in an on-us document bin 54 while the transit documents are placed in a transit bin 56. Alternately, any number of bins may be used. For example, the on-us items may be sorted into on-us bins for checks, currency, coupons or other types of documents. The user takes the physical documents from the bin 54 and places them in physical storage area 52. The storage area may be near the sorting unit or may be housed in a separate facility. The transit documents are transported via a transport mechanism to a power-encoder 58 where the MICR, CAR, and LAR data are power-encoded onto the document, as is known in the art. The power-encoded document is then transported to the financial institution required. It should be noted that in an alternate embodiment, the system of FIG. 5 would be paperless. In this case, the document transport mechanism 51 simply discards the documents; units 56 and 58 are omitted. In yet another embodiment the system would process some paper documents and unit 56 would be omitted.

Figure 6:
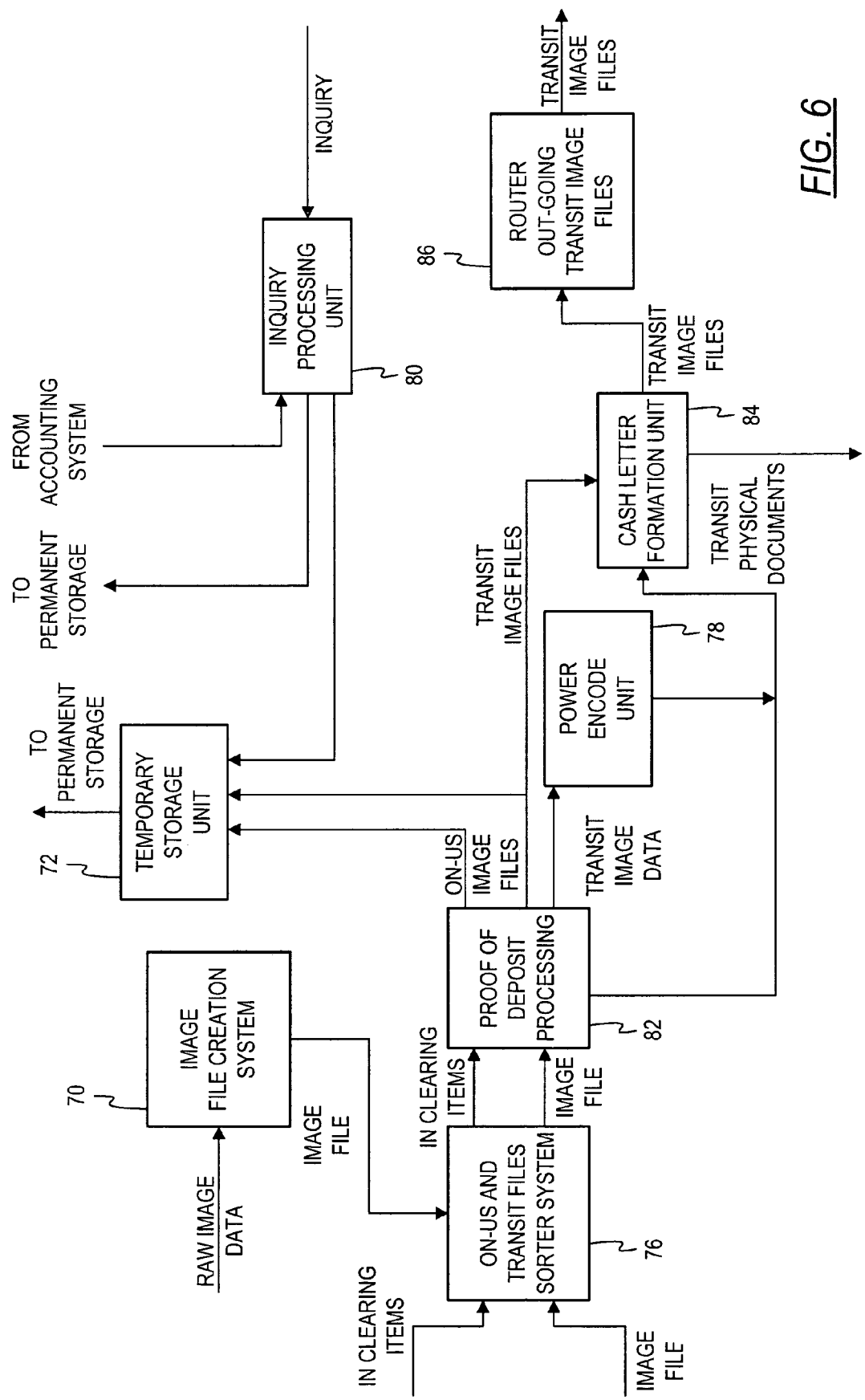
FIG. 6 is a block diagram of the image processing system.

Turning now to FIG. 6, the image processing system 16 comprises an image file creation system 70 which accepts raw image data. The image data is processed as described with respect to the remote image capture unit above. This image file creation system 70 is located at the image processing system when the remote image capture unit 16 lacks the capability for processing a document image.

An on-us and transit file sorter system 76 sorts on-us and transit image files and physical documents. Both the on-us and transit image files are sent to a temporary storage unit 72 which stores the image files for a short period of time, for example, until the end of the day. At the end of that time period, the temporary storage transmits these files to a permanent storage 18. The transit image files are sent to a cash letter formation unit 84. The physical transit items are encoded by a power encode unit 78. The on-us physical items are imaged by the system 76 and their image files processed as described above. The sorter system 76 sends both inclearing items and image files to a proof-of-deposit processing system 82. Alternatively, MICR encode units may be located at remote units throughout the system.

The proof-of-deposit processing unit 82 determines whether documents and images accepted are the same as the declared deposited amount. In other words, the unit determines that the documents declared as input are going out as an output. The proof-of-deposit processing unit 82 accepts both physical items (inclearing items including both on-us and transit items) and image items. The image items include image files from other banks, image files from remote capture units, and image files from the image file creation system 70. Of course, in an image-only system the functionality of processing physical documents would not be present.

The data portion of the transit image files is sent to a power-encode unit 78 where, if needed, the information is placed on the physical document sent out as a transit item from a cash letter formation unit 84. The power encode unit 78 can be omitted in a paperless network.

The transit image file and any transit documents are also sent to the cash letter formation unit 84 where the individual image files and documents having the same destination are bundled together into a single packet of data or physical packets. Outgoing transit file router 86 then transmits the data to its correct destination. The router 86 adds data, as is known in the art, ensuring that the packet will reach its destination. In the case of physical documents, the documents are sent to the correct financial institution. Of course, in an entirely image-based network, the handling and processing of physical documents would be omitted.

A inquiry processor 80 accepts inquires. The inquiry processor determines whether the image file requested is in temporary storage 72. When found, the inquiry processor 80 determines whether access permission has been granted. If permission has been granted, the image file is sent over the correct lines to the output. The inquiry processor also receives inquiries from the accounting system and routes them over the inquiry line to the appropriate outside destination.

Reference is once again made to FIG. 1. Image files, the data portion of image file, and inquiries are transmitted to branches of the same bank 40, the federal reserve system 44, or to outside financial institutions 48. The data portion of the image file follows the traditional settlement path. That is, the data portion of the image file may first go to the federal reserve if two banks do not have a direct account. There, the moneys are transferred by an accounting system as described above. Alternately, banks may have special accounts between each other. This usually occurs when the banks have a large volume of transactions. Then, the image data files are sent to the banks directly.

Thus, financial institutions and the federal reserve system transfer image files, the data portion of image files, and inquiries over dedicated lines 37*a*, which are connected directly between financial institutions. The above information can also be transmitted over the internet 37*b* as is known in the art. Also, the above data can be transmitted over a private bank-net which provides connections between the various branches of a bank. Also, the above information can be transmitted over a federal reserve network line 37*d* to banks in the federal reserve system. Finally, the above data can be transmitted over a clearing house network line 37*e* to a financial clearing house.

As an alternative, or in addition to the communication links described above, the image data may be stored on CD ROM (or any other type of magnetic or optical media) and physically transported to any point in the system. In this way, data can also be viewed at points not coupled to the network.

It will accordingly be recognized that the image processing network described herein processes several types of physical and electronic data units.

First, it processes physical documents (for example, checks).

Second, it processes image files. The image file comprises three portions. A first portion contains binary encoded data representing the images of both sides of the document. Alternatively, this first portion may contain only a portion or portions of the document. The second portion of the image file contains data extracted from the images of the document. It is an important feature of the invention that all information in the second portion is obtained from the images. For example, MICR data is obtained from the image of the document rather than alternate extraction techniques such as magnetic reading. In the case of a check, the second portion includes the MICR data, such as the amount of the check and the bank drawn. A third portion contains a unique identification code or tag associated with the document. For example, if the document is currency, the unique identifier may be a serial number, seal, plate number, or customer number.

For those documents where data fields are unreadable, the image can be transmitted to a central location where an operator would view the image and key in the amount. Also, the operator keys in any non-readable MICR or CAR/LAR data. In the context of a bank imaging network, the bank would choose between simply sending forward the captured image for final settlement or waiting for the physical document to arrive from the remote location. If the physical document arrives at the central location, there would be a benefit from the imaging. The amount field will already have been entered. Therefore, when the checks are transported through the centralized check processing system, the on-us checks immediately have the amount field MICR encoded. This represents a savings in time and labor over current systems which require one pass for MICR encoding and one for sorting checks into various output bins.

Alternatively, the customer may be prompted to enter unreadable data. Allowing a customer to enter missing data may be allowable for only selected customers of the financial institution. Alternatively, all customers may be allowed this option and the image file tagged for later verification of the amount.

Similarly, being able to MICR encode on the first pass on transit checks reduces the number of passes through the scanner. Therefore, the productivity and efficiency of the proof-of-deposit processing are increased regardless of which methods are used (i.e., actual handling of physical documents or only image processing).

The image file data portion also includes the identities of banks where the image file has been processed. Both the data portion and the image portion have tags uniquely identifying the document, and pointers to where the other portion is located. The two portions are not necessarily physically contiguous. A security code is attached in both portions so that the item can transit between banks or depositors and the bank.

Third, it manipulates the data portion of the image file. As explained, the entire image file need not be sent to all destinations in the network.

Finally, it handles inquiries as to the images. The inquiry is data representing the document number and will be correctly routed through the network until the document is found or permission to access the document is denied. Inquires are used by bank personnel or customers to view the image file of the document.

Figure 7:
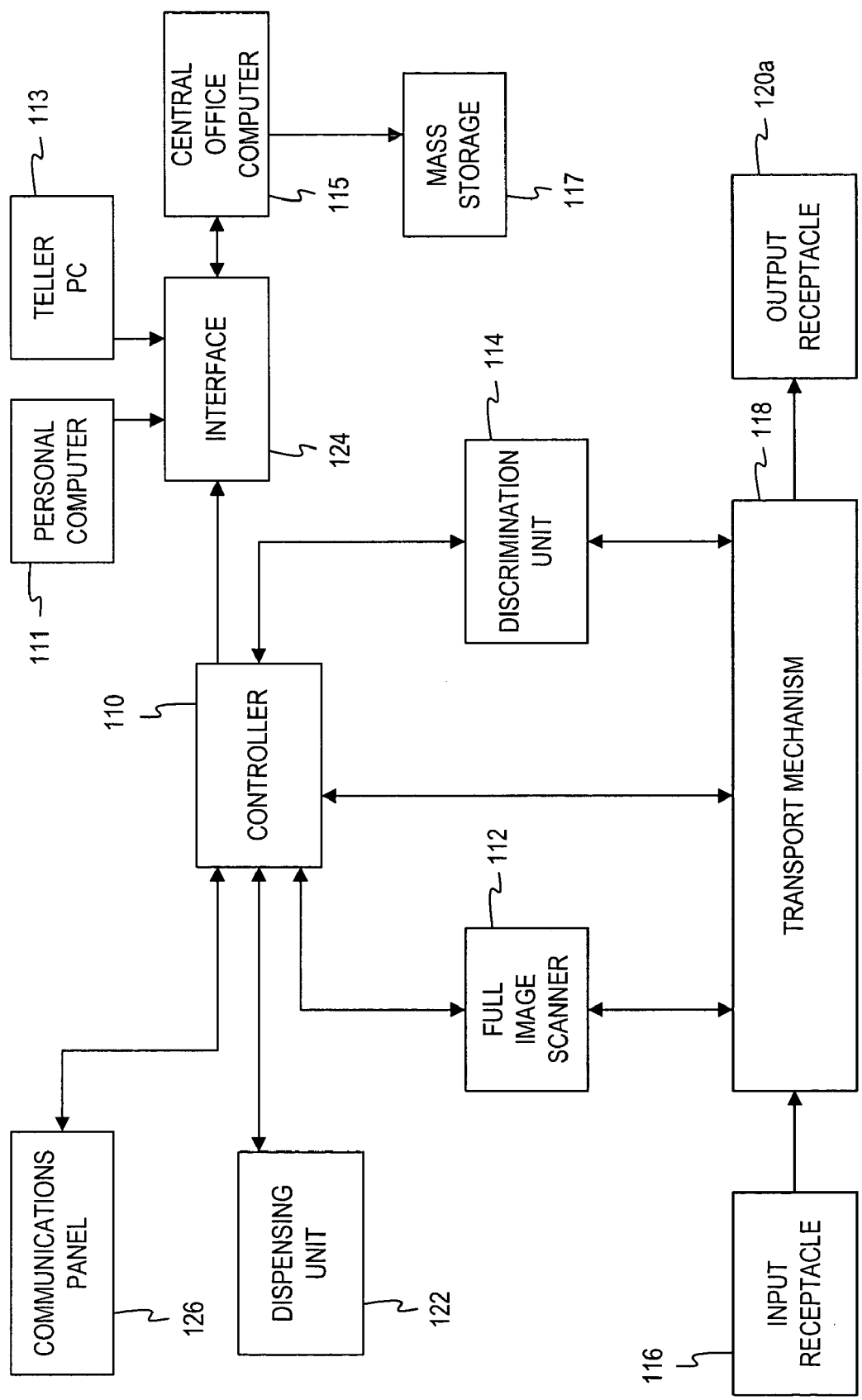
FIG. 7 is a block diagram of a document processing system with a single output bin.

Reference is now made to FIG. 7 for a description of another embodiment for the network. A user deposits documents into an input receptacle 116. A transport mechanism 118 transports the documents from the input receptacle 116 past an image scanner 112, as the documents are illuminated by a light (not shown). The image scanner 112 scans an image (for example, the full image) of the document, recognizes certain fields within the document, and processes information contained within these fields in the document. For example, the image scanner 112 may search for a number field when processing the document, determine the number once the field is located, and store the number for later use by the system. The system may also be used to capture any document image for electronic document display, electronic document storage, electronic document transfer, electronic document recognition (such as check amount recognition) or any other processing function that can be performed using an electronic image.

Next, the transport mechanism 118 transports the document past a discrimination and authentication unit 114. The discrimination and authentication unit 114 authenticates the document. On documents such as checks, the system may capture information such as the check amount, account number, bank number, or check number. The discrimination and authentication unit 114 also directs the transport unit 118 to place the document in the output receptacle 120 as described below.

A dispensing unit 122 dispenses funds to a user. For example, when the user makes a deposit into an account, the system has the capability to return all or part of the deposit back to the user in the form of bills, coins, or other media via the dispensing unit 122. The amount of payback to the user may be supplemented by funds from other accounts, as well, as described below. The dispensing unit 122 is capable of accepting a variety of media including money orders, smart cards, and checks and may include separate units directed to accepting a particular type of media.

Figure 8A:
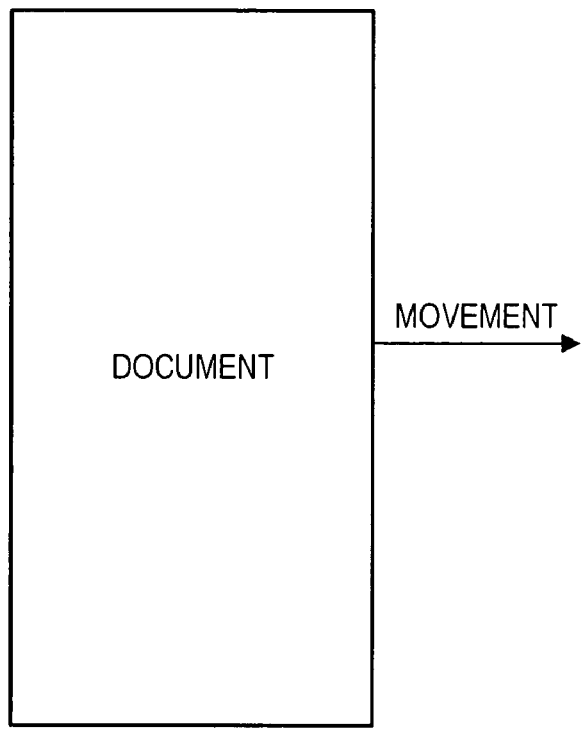
FIG. 8a is a view of a document being scanned by the full image scanner in the wide dimension.
Figure 8B:
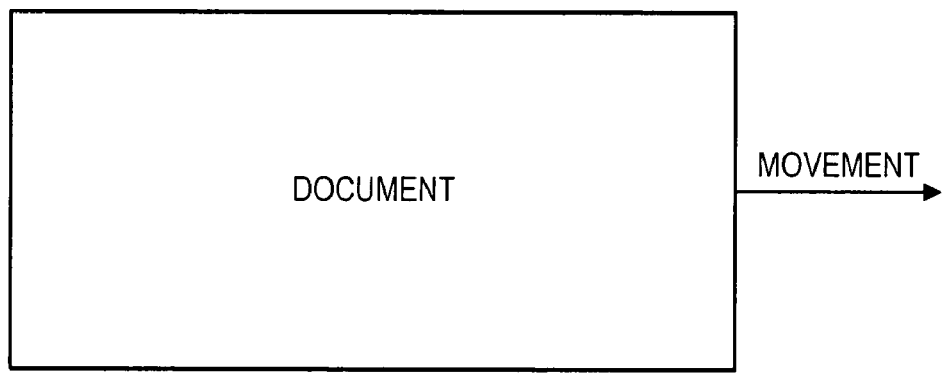
FIG. 8b is a view of a document being scanned by the full image scanner in the narrow dimension.

A controller 110 manages the operation of the system. The controller 110 directs the flow of documents from the input receptacle 116 through the transport mechanism 118, past the image scanner 112 and the discrimination and authentication unit 114, and into the output receptacle 120. The transport mechanism directs the documents through the system such that the documents are scanned either along their wide dimension as shown in FIG. 8a. Alternatively, the documents are passed through the system such that they are scanned along their narrow dimension as shown in FIG. 8b. The controller 110 also directs the dispensing unit 122 to dispense funds to the user and routes information from the full image scanner 112 and the discrimination and authentication unit 114 to an interface 124 which communicates with an outside accounting system or central office. The controller is also capable of directing information from the outside office through the interface and to a communications panel 126. Finally, the controller 110 selectively processes information from the image scanner 112 and the discrimination and authentication unit 114 for use by the system.

Several image scanners 112 can be interconnected to form a local area network (LAN). The individual image scanners 112 may be located at teller stations, in bank vaults, or at businesses, for example. In such a network, some or all image processing is accomplished at the image scanner and not at some centralized location. In other words, the processing functionality is "distributed" in such an arrangement. The individual LANs may have a different physical layouts or topologies. With reference once again to FIG. 4a, image scanners 112 may comprise units 11a–11d connected to common bus 11e. Bus 11e is coupled to interface 11f which communicates with an outside accounting system for performing the functions described herein. In FIG. 4b a LAN using a ring topology is illustrated. Image scanners 112 comprise units 11a–11d which retransmit information to adjacent scanners using point-to-point links. The scanners communicate with other networks through interface 11f. In FIG. 4c a LAN using a star topology is illustrated. A central image scanner 112 as unit 11b is connected to image scanners 112 as units 11a, 11c, 11d and 11g. The central full image scanner communicates to other networks through an interface 11f.

Figure 9:
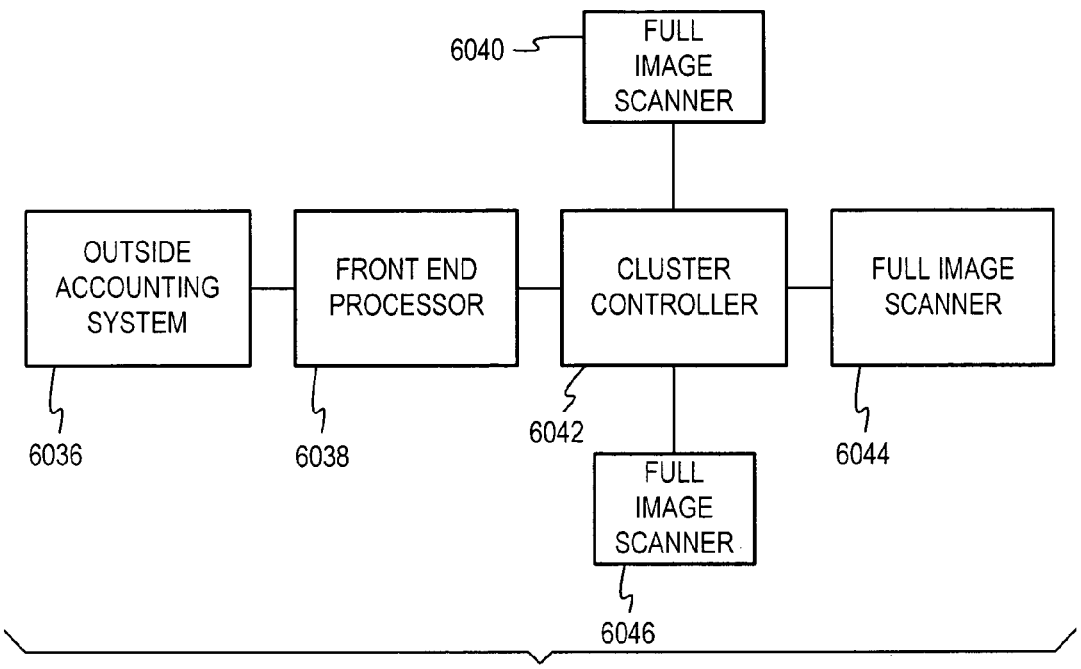
FIGS. 9–10 are a diagrams of networks of image scanners.

Referring now to FIG. 9, there is illustrated another image processing network embodiment. An outside accounting system 6036 communicates with front end processor (FEP) 6038. The FEP 6038 is a software programmable controller that relieves the outside accounting system 6036 of many networking and data communications tasks. The FEP polls devices, performs error checking and recovery, character code translation, and dynamic buffer control. The FEP also serves as a data concentrator concentrating several low speed transmissions into a steady, high-speed flow of data. Image scanners 6040, 6044, and 6046 (for example, scanners 112) communicate with the FEP 6038 (and the outside accounting system 6036) via cluster controller 6042. Cluster controller 6042 serves as an interface between the outside accounting system 6036 and the scanners 6040, 6044, and 6046. The image processing device 6036 has a master/slave relationship with the scanners 6040, 6044, and 6046 and polls, via FEP 6038, the devices and determines if they wish to communicate.

Figure 10:
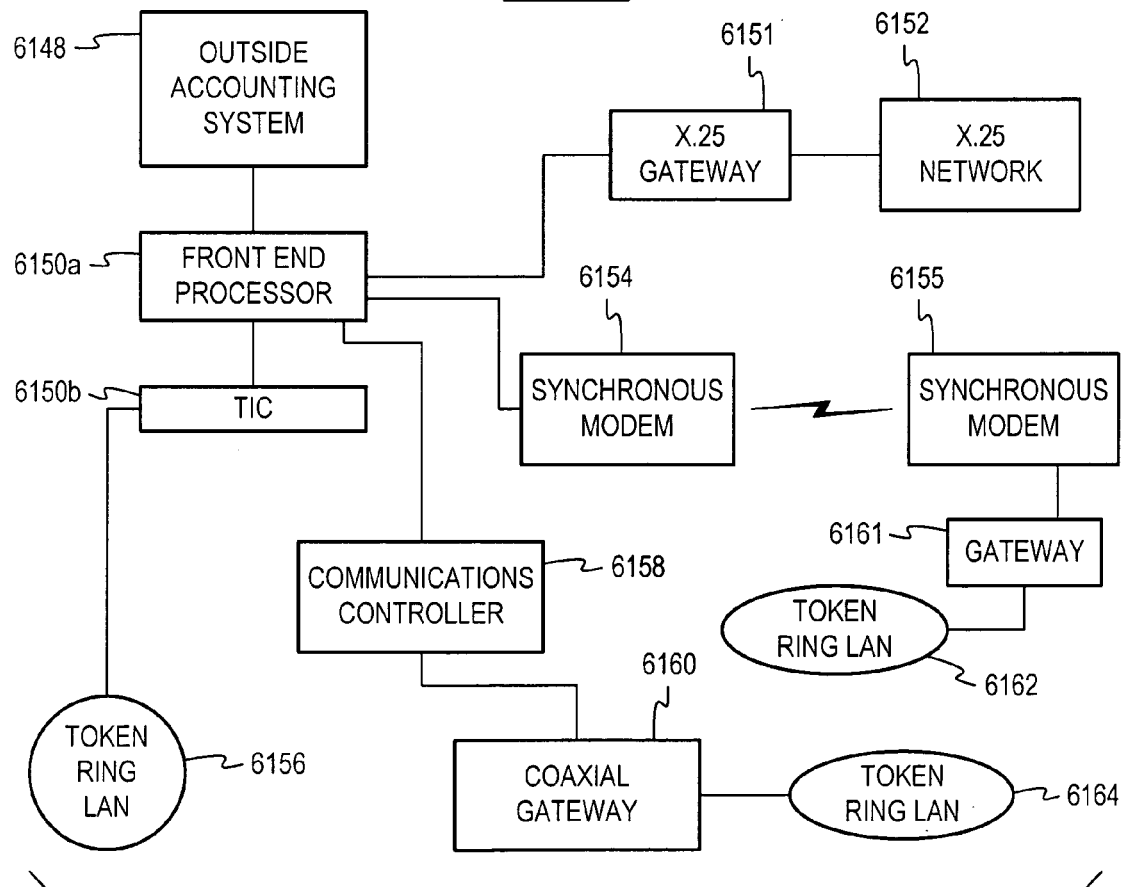

Another image processing network is described in connection with FIG. 10. In this network, gateways are used to connect networks which have different network architectures. Gateways use all seven layers of the OSI model and perform protocol conversion functions at the Application layer. An outside accounting system 6148 is coupled to FEP 6150a which is connected to a token-ring interface coupler (TIC) gateway 6150b. TIC gateway 6150b provides connections to token ring networks 6156, 6162, and 6164 which include other full image scanners.

The highest performance LAN gateway is the link between a token-ring network 6156 and the image processing device's FEP 6150a via the TIC gateway 6150b. The TIC 6150b permits a 4 mbps or 16 mbps connection depending upon the hardware used. The TIC 6150b is viewed by the host as a cluster controller; the outside accounting system polls the TIC 6150b which in turn polls any units on the token-ring network 6156.

The network also contains a remote LAN gateway which functions as a gateway to another token ring LAN 6162. For example, the gateway 6161 functions as a cluster controller and communicates with the FEP using IBM's SDLC protocol via synchronous modems 6154 and 6155 at both sites. The synchronous modems 6154 and 6155 can dial up the FEP at speeds up to 64 kbps.

Remote X.25 LANs (which use the X.25 packet switching protocol and contain full image scanners) can also communicate with the host via X.25 gateways. A gateway 6151 with an adapter card functions as a cluster controller and runs special gateway 6151 software that runs over a given protocol and communicates with the X.25 network. A local coaxial gateway 6160 is also provided which allows a workstation on the LAN to emulate a distributed function terminal (DFT) mode of processing.

It should be realized that the units connected to particular gateways are in no way limited to use with a particular gateway. In fact, the gateways and units can be interchanged and other types of equipment can be used to structure the network as is known to those skilled in the art.

Figure 11:
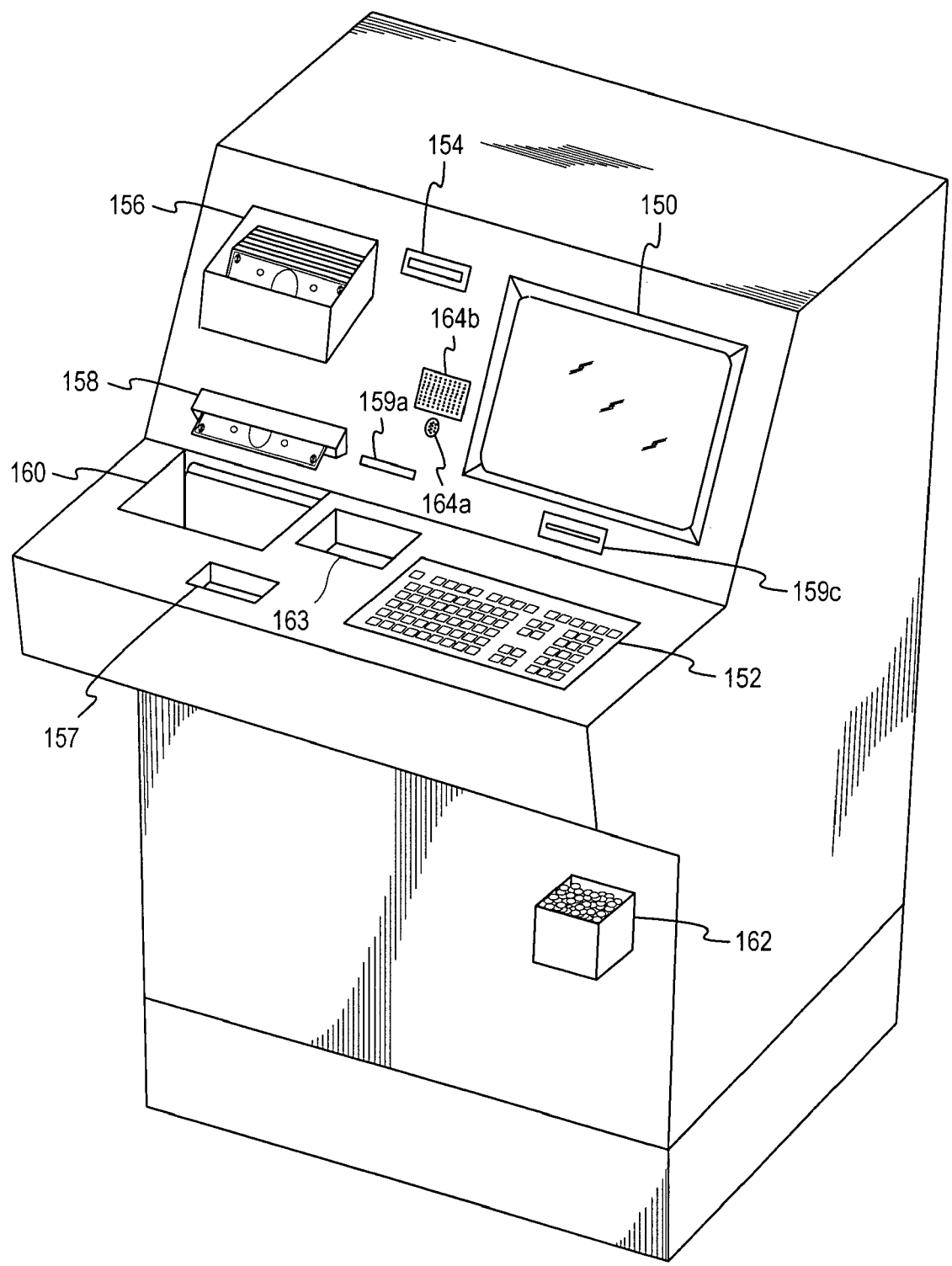
FIG. 11 is a perspective view of one embodiment of the processing system with a video screen and keyboard.

Reference is now made to FIG. 11. The communication panel displays information to the user and accepts user commands. The panel consists of a video screen 150 onto which information to the user is displayed by the system and a keyboard 152 for accepting commands from a user. The communications panel video screen 150 can comprise a touch screen. A slot 154 is used for receiving a user's identification card. The user inserts the card into the slot 154 to access the machine. The user deposits documents into bin 156. Loose currency is dispensed from slot 158, strapped currency from receptacle 160, and loose or rolled coin at receptacle 162.

Figure 12:
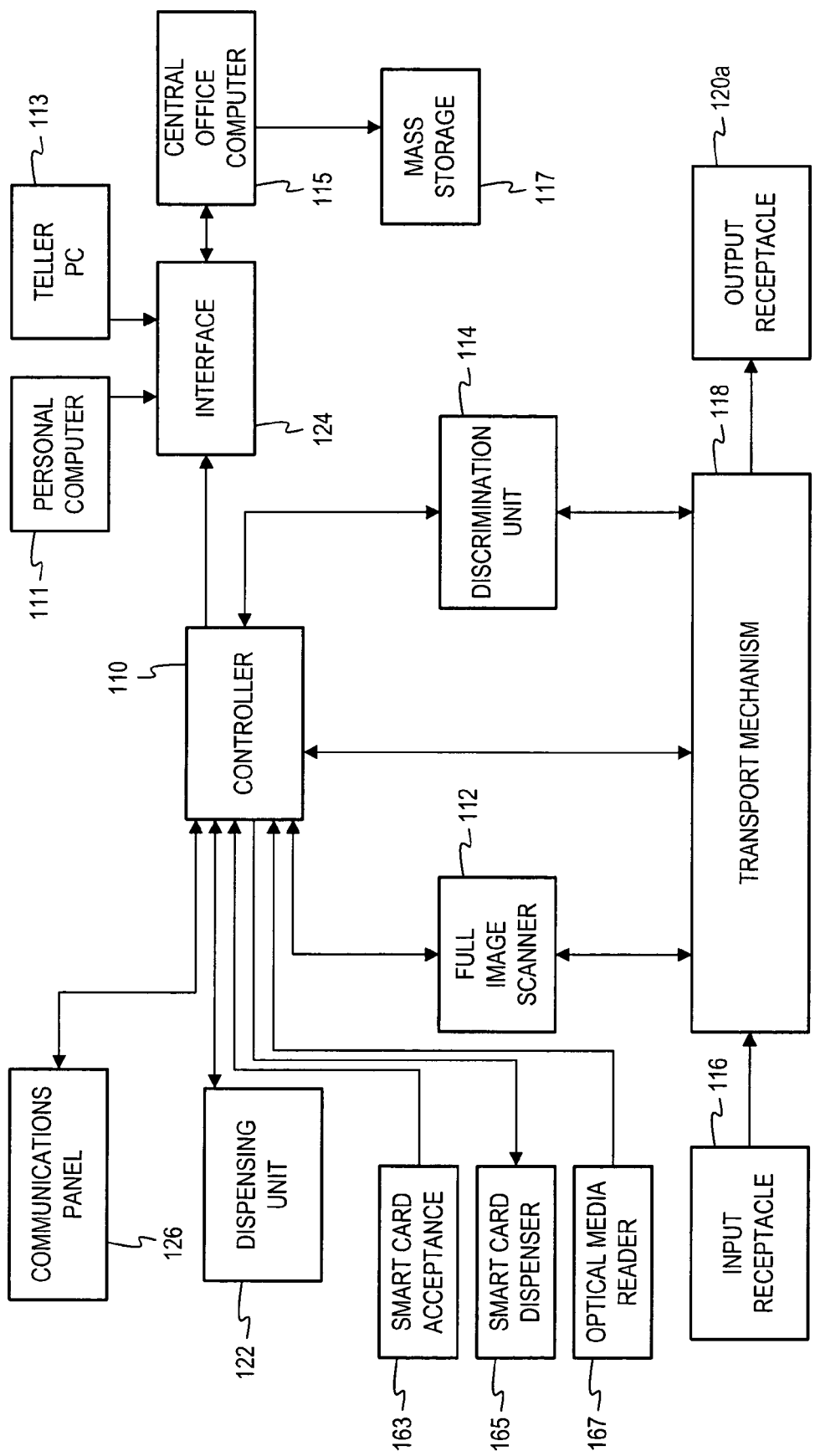
FIG. 12 is a block diagram of the document processing system with modules to insert smart cards, dispense smart cards, and insert optical media.

As shown in FIG. 12, other modules can be added to the system. A smart card acceptance module 163 is provided for accepting smart card. A smart card dispensing module 165 is provided for dispensing smart cards. An optical reader module 167 is also provided for accepting and dispensing optical media.

An audio microphone 164a and speaker 164b allow two-way communication between the user and a central office, for example, with a teller at a bank's central office. Thus, during the operating hours of a financial institution, bank personnel are connected to the system by the audio microphone 164a and speaker 164b. The central office computer 115 (which includes a video terminal) also receives and displays video images of the documents from the system. If the documents are not recognizable, the image is forwarded to the bank employee for observation on the terminal. The bank employee could then discuss the document with the customer. In this case, the bank employee could decide to accept the document immediately for credit after reviewing the image on the terminal. With an image scan, enough information may have been scanned on an unrecognizable document that review by the bank employee on the terminal will enable the bank employee to accurately call the value of the document. Additionally, the image of a document may be presented on a teller's monitor. By reviewing the data, the teller may be able to enter missing data via their keyboard, if the image is recognizable. If the teller is near the machine and an image on the monitor is unclear, the teller may remove the document from the scanner, inspect the document, and enter the missing data. The value could also be entered by the denomination keys and other information by a alphanumeric keypad, as described below, or with a mouse and applications software. Additionally, the value could be entered by a touch screen device or by any combination of the input means described above. The document would then be placed in back of the output receptacle 120 and processing would continue. In some situations, the customer might enter the value or other information concerning the unidentified documents. This entry would be via the keyboard and credit would be given to the customer's account only after the document is verified by bank personal. In other situations, the customer may merely hold onto the document.

A mentioned previously, the system has a slot for the insertion of a customer identification card. Alternatively, the customer might enter a PIN identification number through the keyboard. After identification of the customer is determined, then the customer submits a document (such as a check or savings account withdrawal slip) and immediate payment to the customer is made.

Figure 13:
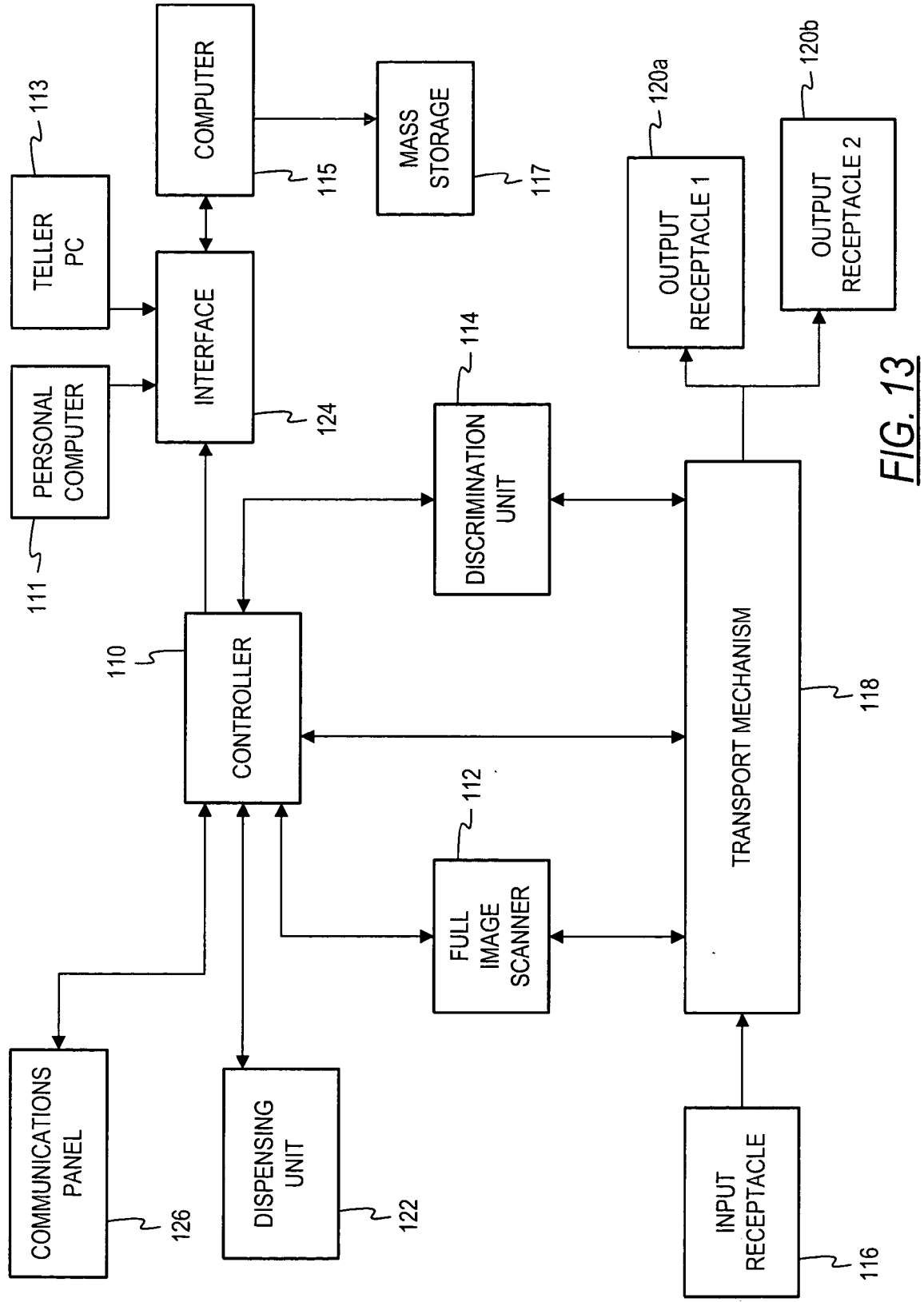
FIG. 13 is a block diagram of the document processing system with dual output bins.

The output receptacle 120 can be a single bin as shown in FIG. 7 into which all documents transported by the transport mechanism 118 are stored. Alternatively, the output receptacle 120 can consist of multiple bins (two or more) as shown in FIG. 13. In the case of dual bins, one type of documents (for example, identifiable documents, or certain value documents, or certain handling documents) are placed into the first bin and another type of documents (for example, unidentifiable documents, or other value documents, or other handling documents) are placed into the second bin. It will be understood that any number of output bins can be used to store the documents.

Figure 14:
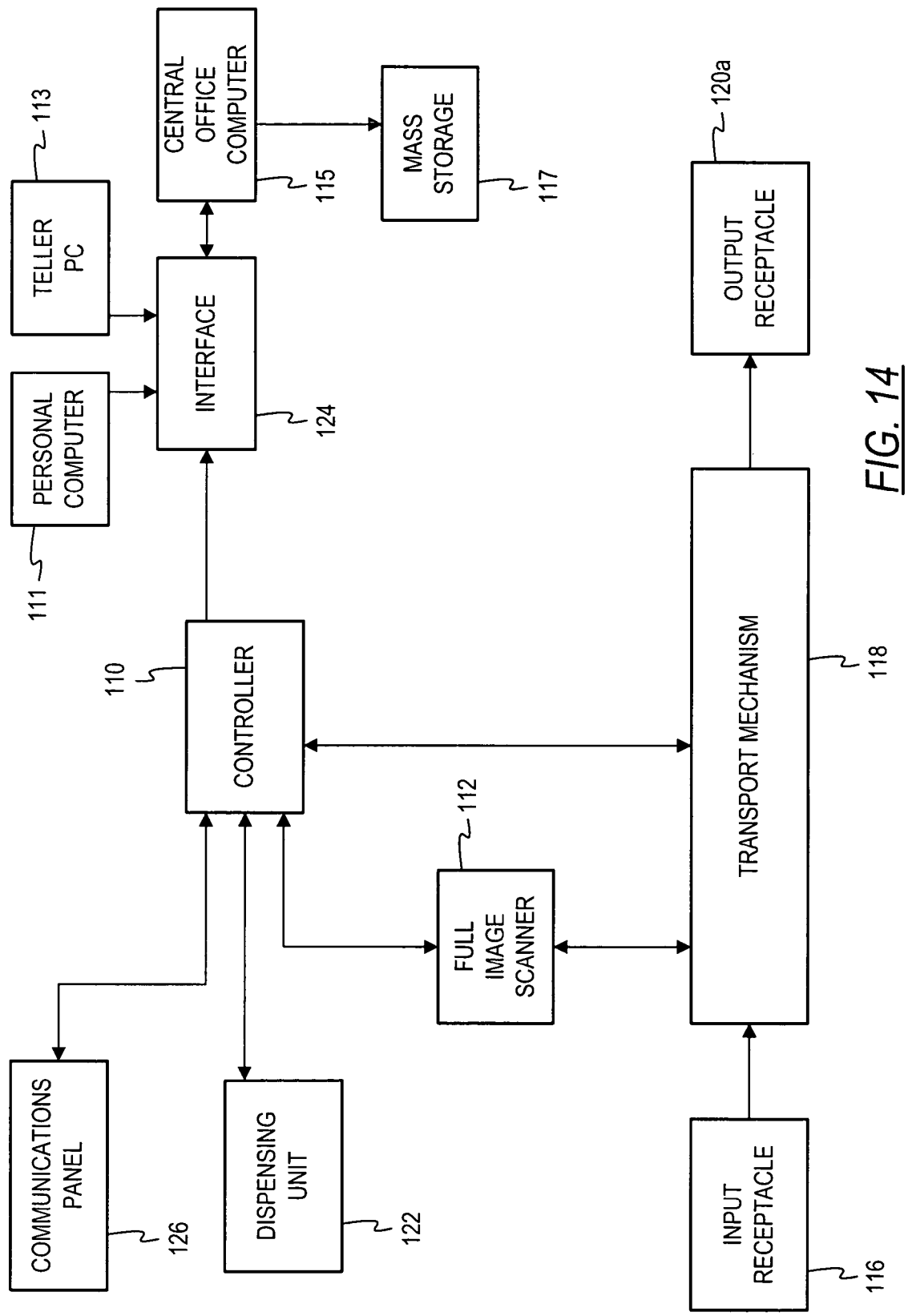
FIG. 14 is a block diagram of the document processing system without a discrimination unit.

As shown in FIG. 14, the image scanner can be used without the discrimination unit and one or more output receptacles.

Figure 15:
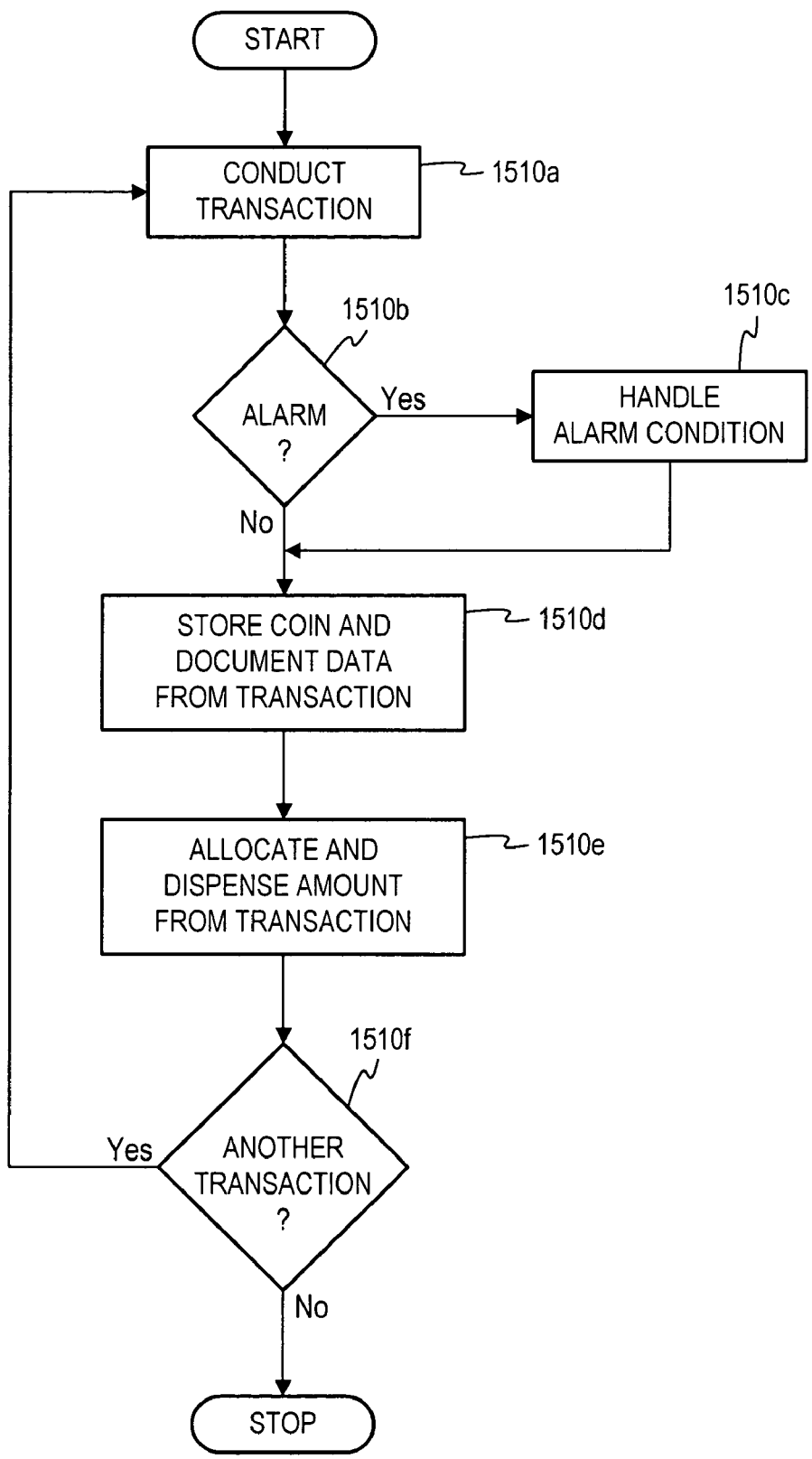
FIG. 15 shows a flowchart describing the operation of the document processing system.

The general operation of the automated document processing system is illustrated in FIG. 15. The user conducts a transaction at step 1510a. During the transaction step 1510a, the user places documents into the input receptacle 116, the image scanner 112 scans an image of the documents, selected parts of the image are processed by the image scanner 112, the discrimination and authentication unit 114 authenticates the document, and the document is placed in the output receptacle 120. During the transaction step 1510a, any interaction with personnel at a central office, for example, with a bank teller, occurs. As previously described, the system may also include a smart card processing module, modules which accept and read all forms of magnetic and optical media, and modules which dispense smart cards and all forms of optical and magnetic media.

An alarm condition may be generated during a transaction. At step 1510*b*, the system determines whether an alarm condition is present. If the answer is affirmative, then at step 1510*c* the system responds to the alarm condition. The response may be automatic or may require manual action by the user. If the response is automatic, the system preferably flashes a warning light, for example a 24 VAC external light driven by a relay. If the response required is manual, the user is required to perform some manual action and instructions of how to proceed may be displayed to the user on a user display screen, as described below. Alarm conditions occur when the user presses a help key; when a currency dispenser becomes empty; upon a system error condition; and when a bin is full. If the answer to step 1510*b* is negative or upon completion of step 1510*c*, operation continues at step 1510*d*.

After the alarm condition is tested or handled, the amount deposited in the transaction is stored at step 1510*d* for later use. The values are preferably stored in a computer memory. Next, at step 1510*e*, a distribution is made of the deposited amount stored in step 1510*d*. Step 1510*e* can, for example, consist of receiving the deposited amount, allocating it to a savings account, or receiving part of the deposit back in bills and crediting the remainder to a bank savings account. At step 1510*f*, the user is given the choice of conducting a new transaction. If the answer is affirmative, the system returns to step 1510*a* which is described above. If the user answers in the negative, then the machine stops.

Figure 16:
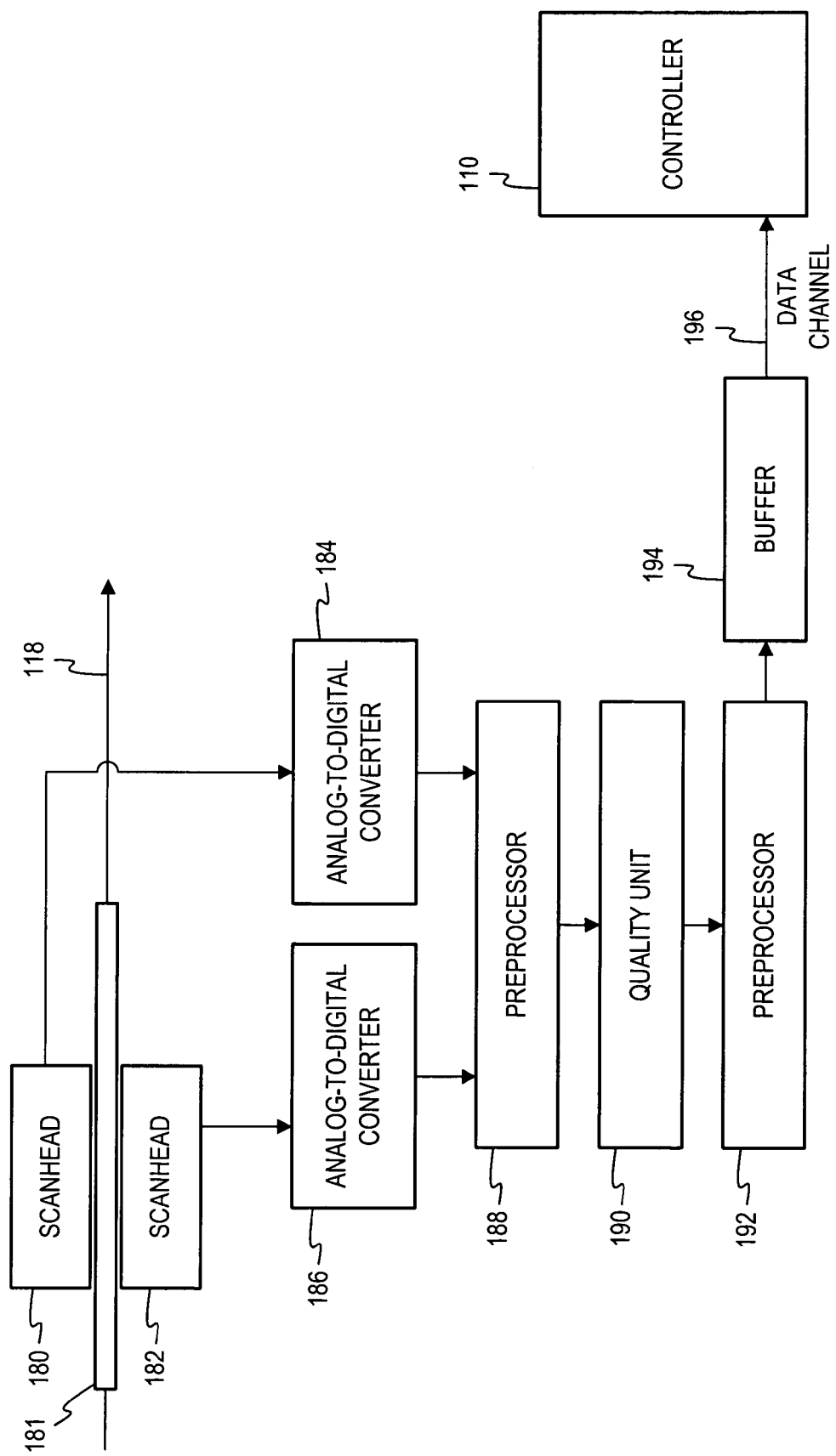
FIG. 16 is a block diagram of the full image scanner according to principles of the present invention.

An embodiment of the image scanner 112 is now described in detail. In accordance with the present invention, the image scanner may be of the type disclosed in U.S. Pat. No. 4,888,812 which is herein incorporated by reference in its entirety. As shown in FIG. 16, the front and back surfaces of the documents are scanned by scan heads 180 and 182 and the images processed into video image data by electronic circuitry. The scan heads 180 and 182 are preferably charge coupled scanner arrays and generate a sequence of analog signals representing light and dark images defining the image on the document. The scan heads 180 and 182 are arranged for simultaneously scanning both the front and back of the documents and are connected respectively to analog-to-digital converters 184 and 186 which convert the analog values into discrete binary gray scale values of, for example, 256 gray scale levels. The scan heads are capable of obtaining images of varying resolutions. The particular resolution chosen, which can be varied by the user, is selected based upon the type of document being scanned, as is known in the art.

The high resolution gray scale image data from the analog-to-digital converters 184 and 186 is directed to an image data preprocessor 188 in which the data may be enhanced and smoothed and which serves to locate the edges of successive documents and discard irrelevant data between documents. If the documents are slightly skewed, the image preprocessor 188 can also perform rotation on the image data to facilitate subsequent processing.

The image data is monitored for unacceptable image quality by image quality unit 190. For example, the image quality unit 190 and monitors the distribution of gray scale values in the image data and create a histogram. As is well known in the art, acceptable quality images have a distribution of gray scale values within certain prescribed limits. If the gray scale distribution of the histogram falls outside these limits, this is indicative of poor image quality and an error condition is generated.

The image data is transmitted from the quality unit 190 to the image processor 192. As is known in the art, the optical scanners can additionally scan specified fields on the faces of the document. For example, when processing checks, the scan head may search for the "$" symbol as a coordinate to the left of the numeric check amount field box. As is known in the art, a straight coordinate system or dimension system is used where known dimensions of the box are used to locate the field. The processor 192 can be programmed to locate fields for various types of documents perform processing as follows. Based on scanning certain areas on the document, the processor 192 first identifies the type of document. Then, based on the outcome of the previous step, certain fields of interest are located, and the information stored for use by the system. The processor 192 may also compresses the image data, as is known in the art, in preparation for transmission to an outside location.

The amount of image data per document may vary depending upon the size and nature of the document and the efficiency of the data compression and reduction for that particular document. To ensure that no data is lost in the event that the volume of image data may temporally exceed the transfer capacity of the high speed data channel, a prechannel buffer 194 interposed prior to the data channel, which is connected to the controller 110. The capacity of the pre-channel buffer 194 is continually monitored by the controller 110 so that appropriate action may be taken if the buffer becomes overloaded. The compressed video image data is received by the controller 110 over a high-speed data channel 196 and is initially routed to temporary storage. The image buffer is preferably of a size capable of storing the image data from at least several batches or runs of checks or similar documents. The controller 110 in the full image scanner performs the functions of analyzing the data. Alternatively, as discussed above, analysis of the data can occur at the central office computer 115 or at a personal computer 111 attached to the system.

A plurality of document processing systems may be connected in a "hub and spokes" network architecture as is known in the art. In order to prevent congestion, the image buffer on each document processing system stores data until polled by the central office computer or outside accounting system. When polled, the data is uploaded to the central office computer or accounting system.

Other scanning modules and methods can be used in place or in addition to the particular one described above. These include CCD array systems, multi-cell arrays and other well-known scanning techniques. Examples of these techniques and devices are described in U.S. Pat. Nos. 5,023,782; 5,237,158; 5,187,750; and 4,205,780 all of which are incorporated by reference in their entirety. The scanning module can also be a color image scanner such as the type described in U.S. Pat. No. 5,335,292 which is incorporated by reference in its entirety.

The discrimination and authentication unit may take on any one of a number of suitable forms. Reference is made to U.S. Pat. No. 6,363,164, the disclosure of which is hereby incorporated by reference, which teaches discrimination and authentication techniques and processes relating to currency bills in particular but which may be extended to the processing of other documents including checks.

In general, such discrimination and authentication units include more or more scanheads (for example, optical scanheads) that scans for characteristic information from a scanned document which can be used to identify the document type. One scanning technique directs a beam of coherent light onto the transport path so as to illuminate a substantially rectangular light strip upon a document positioned on the transport path below the scanhead. Light reflected off the illuminated strip is sensed by a photodetector positioned directly above the strip. The photodetector output signal is converted into a digital signal for processing. Other scanhead types include magnetic, optical, electrical conductivity, and capacitive sensors. The output signal provides an analog representation of measured characteristic variation (for example, reflected light). This variation serves as a measure for distinguishing and authenticating the document. For example, the variations can represent a characteristic pattern that is fairly unique for a given document provides sufficient distinguishing features among many characteristic patterns for different types of documents. An example of this process is described in U.S. Pat. No. 5,295,196. The processor is programmed to identify the document as corresponding to a set of stored intensity signal samples for which the correlation number resulting from pattern comparison is found to be the highest.

Two-sided scanning of documents may also be used.

In addition to scanned characteristic patterns, color may also be used to discriminate documents. Such color sensing may be achieved by, for example, incorporating color filters, colored light sources, and/or dichroic beamsplitters.

With respect to magnetic detection, the unit may be capable of reading and identifying all types of magnetic ink (such as "low dispersion" magnetic inks as used on checks; where "low dispersion" magnetic ink is magnetic ink mixed with color ink and used to print the background of checks as well as the name and address information on the check). Magnetic sample and variation data may be mathematically manipulated to simplify its use by summing data points to yield a checksum that is compared to expected values for genuine documents.

With respect to magnetic sensing, a variety of characteristics can be measured. These include detection of patterns of changes in magnetic flux (U.S. Pat. No. 3,280,974), patterns of vertical grid lines (U.S. Pat. No. 3,870,629), the presence of a security thread (U.S. Pat. No. 5,151,607), total amount of magnetizable material (U.S. Pat. No. 4,617,458), patterns from sensing the strength of magnetic fields (U.S. Pat. No. 4,593,184), and other patterns and counts from scanning different portions of the document (U.S. Pat. No. 4,356,473).

With regard to optical sensing, a variety of characteristics can be measured such as detection of density (U.S. Pat. No. 4,381,447), color (U.S. Pat. Nos. 4,490,846; 3,496,370; 3,480,785), length and thickness (U.S. Pat. No. 4,255,651), the presence of a security thread (U.S. Pat. No. 5,151,607) and holes (U.S. Pat. No. 4,381,447), and other patterns of reflectance and transmission (U.S. Pat. Nos. 3,496,370; 3,679,314; 3,870,629; 4,179,685). Color detection techniques may employ color filters, colored lamps, and/or dichroic beamsplitters (U.S. Pat. Nos. 4,841,358; 4,658,289; 4,716,456; 4,825,246, 4,992,860 and EP 325,364). An optical sensing system using ultraviolet light is described in U.S. Pat. No. 5,640,463.

In addition to magnetic and optical sensing, other techniques of detecting characteristic information include electrical conductivity sensing, capacitive sensing (U.S. Pat. Nos. 5,122,754 [watermark, security thread]; 3,764,899 [thickness]; 3,815,021 [dielectric properties]; 5,151,607 [security thread]), and mechanical sensing (U.S. Pat. Nos. 4,381,447 [limpness]; 4,255,651 [thickness]).

When checks are utilized in a transaction, the check is tagged with the customer checking account number, the bank number, and the Federal Reserve Region. If multiple banks are involved in the payment, each bank's number is tagged to the payment through an endorsement on the back of the check. Using the networks and systems described herein, tagging of the checks can be made electronically. In other words, the customer checking account number, bank number, and Federal Reserve region are electronically tagged to the check's image.

The accounting system processes information associated with checking accounts. The systems and networks described herein process checks and checking account-related documents by scanning an image thereof at a number of locations including the teller line, a drive-up window, an ATM. With the scanning and imaging of the check, the check need not be transmitted to a central location for processing. The accounting system maintains a record of all transactions regarding the checking account, balances, and tracks information associated with a particular check.

Again, documents can be immediately be scanned at point of entry without transporting the document to a central location. Information extracted from the imaged documents is sent to the accounting system where it is stored, monitored, and analyzed. The accounting system compiles statistics on customers and their accounts and maintains current balances, interest earnings, available funds, available advances, and records all information concerning deposits and withdrawals.

The accounting system also distributes funds between various accounts. The accounting system can make a withdrawal from an account to pay an invoice (such as a mortgage). To accomplish this, a customer may issue a check for payment and submit this against a coupon or invoice provided to the customer. The coupon and the check are processed by the systems and networks described herein to obtain document images. The information is read by the image scanner and transmitted to the accounting system which conducts the required transfers. Notably, a bank employee can run the check and coupon through the image scanner at any bank location—branch, central offices, payment center, etc. The document would not have to be forwarded to a centralized proof department for handling.

Another important service provided by the accounting system for business accounts is cash management. This can be provided by lock box services where a company has its customer payments directed to a bank "lock box." This lock box address is at a bank location and all customer payments to the company are diverted to this lock box address. This ensures that the payments are deposited as quickly as possible so that the bank's commercial customers have immediate use of the funds at the bank. The next day the outside accounting system at the bank advises the business which payments were received into the account and the business adjusts its accounts receivables balance one day later, creating a timing problem due to the delay.

The systems and networks described herein enable a business to scan the documents through the scanner at the business's location (thus, eliminating the need to first send payments to a bank lock box location) and receive immediate credit electronically through the accounting system located at the bank. The check images and other images would immediately be available via the accounting system at the bank for settlement purposes. Therefore, lock box services by banks are handled on a de-centralized basis at bank customer locations.

With the systems and networks described herein transactions involving checks are processed substantially immediately. That is, account adjustments are processed in real time rather than waiting for the end of the day. Also, images of all documents can be stored on mass storage devices at the central office. The images could also be stored at the unit itself, or at another remote system. The images could also be temporarily stored and forwarded at a later time.

In one embodiment, documents are transported, scanned, and identified at a rate in excess of 800 documents per minute. In another embodiment, documents are transported, scanned, and identified at a rate in excess of 1000 documents per minute.

While the invention is susceptible to various modifications and alternative forms, specific embodiments thereof have been shown by way of example in the drawings and herein described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A system for processing checks, comprising:
   an image processing device that receives a paper check, scans the received paper check to create a check image of at least one side of the paper check and obtains check information relating to the scanned paper check;
   a communications link over which the check image and obtained check information is communicated; and
   an accounting system connected to the communications link and operable to update a funds balance of a financial account associated with the paper check in response to the obtained and communicated check information.

2. The system of claim 1, wherein the image processing device optically recognizes fields within the scanned paper check so as to extract field data as the check information relating to the paper check.

3. The system of claim 1, further comprising a sorting mechanism for sorting the paper check into a bin that is designated for truncation of further processing of the paper check.

4. The system of claim 1, wherein the image processing device scans the received paper check on both sides to create the check image.

5. The system of claim 1, wherein the accounting system stores check images.

6. The system of claim 1, wherein updating the funds balance of a financial account comprises debiting or crediting funds of the account.

7. The system of claim 1, wherein the check image comprises an image file including an image portion containing image data and a data portion containing check information relating to the paper check.

8. The system of claim 7 wherein the check information comprises at least one of a customer checking account number, bank number, federal reserve region, and a financial institution involved in payment of the paper check.

9. The system of claim 1 further comprising means for sorting the images of checks into images relating to "on-us" checks and "transit" checks.

10. The system of claim 1 further comprising a sorting mechanism to physically sort the paper checks into checks for which bank reconciliation of at least one account associated with the paper check is made based on the communicated check information and checks for which bank reconciliation of at least one account associated with the paper check is made based on the paper check.

11. The system of claim 1, the checks having a wide edge and a narrow edge, further comprising a transport mechanism operable to convey the checks along a transport path past the image processing device with their wide edges leading.

12. A method for check processing, comprising:
    receiving a paper check;
    scanning the received paper check to create a check image of at least one side of the paper check;
    obtaining check information relating to the scanned paper check;
    communicating the check image and obtained check information; and
    updating a funds balance of a financial account associated with the paper check in response to the communicated check information.

13. The method of claim 12, wherein obtaining comprises optically recognizing fields within the scanned paper check so as to extract field data as the check information relating to the paper check.

14. The method of claim 12, further comprising sorting the paper check into a location that is designated for truncation of further processing of the paper check.

15. The method of claim 12, wherein scanning comprises scanning the received paper check on both sides to create the check image.

16. The method of claim 12, further including storing communicated check images.

17. The method of claim 12, wherein updating the funds balance of a financial account comprises debiting or crediting funds of the account.

18. The method of claim 12, further including the check image comprising an image file including an image portion containing image data and a data portion containing check information relating to the paper check.

19. The method of claim 18 wherein the check information comprises at least one of a customer checking account number, bank number, federal reserve region, and a financial institution involved in payment of the paper check.

20. The method of claim 12 further comprising truncating further processing of the paper check following scanning of the paper check.

21. The method of claim 12 further comprising sorting the images of checks into images relating to "on-us" checks and "transit" checks.

22. The method of claim 12 further comprising physically sorting the paper checks into checks for which bank reconciliation of at least one account associated with the paper check is made based on the communicated check information and checks for which bank reconciliation of at least one account associated with the paper check is made based on the paper check.

23. The method of claim 12, the checks having a wide edge and a narrow edge, further comprising conveying the checks along a transport path past a device where the scanning is performed with their wide edges leading.

24. A check processing network, comprising:
    a plurality of check imaging devices, each such device receiving paper checks, scanning the received paper checks to create check images of at least one side of the paper checks and obtaining check information relating to the scanned paper checks;
    a financial institution accounting system operating to receive the check images and update a funds balance of financial accounts associated with the paper checks in response to the obtained check information; and a data communications network interconnecting the plurality of check imaging devices and the financial institution accounting system.

25. The network of claim 24 further including a memory associated with the accounting system for storing the check images.

26. The network of claim 24 wherein the data communications network is a local area network (LAN).

27. The network of claim 26 wherein the LAN utilizes a common bus architecture.

28. The network of claim 26 wherein the LAN utilizes a ring topology.

29. The network of claim 26 wherein the LAN utilizes a star topology.

30. The network of claim 24 further including a cluster controller for interfacing the plurality of check imaging devices and the financial institution accounting system through the data communications network.

31. The network of claim 24 wherein the check information comprises check value.

32. The network of claim 31, wherein updating the funds balance of financial accounts comprises debiting or crediting the accounts by the check value.

33. The network of claim 24, wherein each of the check imaging devices forms the check image to include an image portion storing image data and a data portion storing the check information relating to the paper check.

34. The network of claim 33 wherein the check information comprises information selected from the group consisting of check value, bank identification information, and checking account number.

35. The network of claim 24, further comprising a sorting mechanism for sorting the paper checks into a bin that is designated for truncation of further processing of the paper checks.

36. The network of claim 24 wherein the check information comprises check value, bank identification information, and checking account number.

37. The network of claim 24 wherein the data communications network comprises the Internet.

38. The network of claim 24 further comprising means for sorting the images of checks into images relating to "on-us" checks and "transit" checks.

39. The network of claim 24 further comprising a sorting mechanism to physically sort the paper checks into checks for which bank reconciliation of at least one account associated with the paper check is made based on communicated check information and checks for which bank reconciliation of at least one account associated with the paper check is made based on the paper check.

40. The network of claim 24, the checks having a wide edge and a narrow edge, further comprising at each check imaging device a transport mechanism operable to convey the checks along a transport path past a device performing the scanning with their wide edges leading.

41. A method for processing checks, comprising:

scanning, at a first location, a paper check to create an electronic check image;

truncating further processing of the paper check after scanning;

obtaining information relating to the scanned paper check;

electronically transmitting the electronic image and obtained check information to a second location; and reconciling at least one funds balance of an account associated with the paper check based on the electronically transmitted check information.

42. The method of claim 41 wherein the check information comprises check amount and reconciling the funds balance of the account comprises debiting or crediting the account by the check value.

43. The method of claim 41 wherein the check information comprises bank identification information.

44. The method of claim 41 wherein the check information comprises account number.

45. The method of claim 41 further including electronically storing the electronic image and obtained check information.

46. The method of claim 41 further comprising sorting the electronic images of checks into images relating to "on-us" checks and "transit" checks.

47. The method of claim 41 further comprising physically sorting the paper checks into checks for which bank reconciliation of at least one account associated with the paper check is made based on the electronically transmitted check information and checks for which bank reconciliation of at least one account associated with the paper check is made based on the paper check.

48. The method of claim 41 further comprising sorting the electronic images of checks into different image categories.

49. A check processing system, comprising:

an input receptacle receiving checks;

an image scanner that scans the checks to generate electronic check image files containing an image portion storing image data and a data portion;

a transport mechanism that transports the checks from the input receptacle past the image scanner; and a device to electronically tag the check image files with endorsement data stored in the data portion.

50. The system of claim 49 wherein the transport mechanism transports the checks past the image scanner at a rate in excess of 800 checks per minute.

51. The system of claim 49 wherein the image scanner further obtains information from fields within the checks and stores that information in the data portion of the image file.

52. The system of claim 49 wherein the endorsement data tagged to the check image file comprises check account number and bank information stored in the data portion of the image file.

53. The system of claim 49 further including an accounting system that receives the tagged check image files and updates a funds balance of a financial account associated with a customer depositing the checks by an amount of funds of the deposited checks.

54. The system of claim 53, further including:

means for accepting identification from the customer associated with the financial account; and means for dispensing currency to the customer;

the accounting system updating the funds balance of the financial account with respect to the dispensed currency.

55. The system of claim 49 further including a user input device through which unrecognizable field information may be input for storage in the data portion of the image file.

56. The system of claim 49 further including an interface through which tagged check image files are output to other financial institutions for further processing.

57. A check processing method, comprising:
receiving checks;
scanning the checks with an image scanner to generate electronic check image files containing an image portion storing image data and a data portion;
transporting the received checks past the image scanner; and
electronically tagging the check image files with endorsement data stored in the data portion.

58. The method of claim 57 wherein transporting comprises transporting the checks past the image scanner at a rate in excess of 800 checks per minute.

59. The method of claim 57 further including optically recognizing information from fields within the checks and storing that information in the data portion of the image file.

60. The method of claim 57 wherein the endorsement data tagged to the check image file comprises check account number and bank information stored in the data portion of the image file.

61. The method of claim 57 further including updating, based on the tagged check image files, a funds balance of a financial account associated with a customer depositing the checks by an amount of the funds of the deposited checks.

62. The method of claim 57, further including:
accepting identification from the customer associated with the financial account; and
dispensing currency to the customer;
updating the funds balance of the financial account with respect to the dispensed currency.

63. The method of claim 57 further including a user input device through which unrecognizable field information may be input for storage in the data portion of the image file.

64. The method of claim 57 further including outputting tagged check image files to other financial institutions for further processing.

* * * * *